(12) United States Patent
Shirazi et al.

(10) Patent No.: US 11,996,719 B2
(45) Date of Patent: May 28, 2024

(54) MODULAR STORAGE UNIT WITH CHARGER FOR POWER TOOL BATTERY PACKS

(71) Applicant: MILWAUKEE ELECTRIC TOOL CORPORATION, Brookfield, WI (US)

(72) Inventors: Omid Shirazi, Wauwatosa, WI (US); Nathan J. Gustafson, Milwaukee, WI (US); Matthew J. Peña, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 207 days.

(21) Appl. No.: 17/214,479

(22) Filed: Mar. 26, 2021

(65) Prior Publication Data

US 2021/0305824 A1 Sep. 30, 2021

Related U.S. Application Data

(60) Provisional application No. 63/000,688, filed on Mar. 27, 2020.

(51) Int. Cl.
*H02J 7/00* (2006.01)
*H01M 50/204* (2021.01)
(Continued)

(52) U.S. Cl.
CPC ......... *H02J 7/0044* (2013.01); *H01M 50/204* (2021.01); *H01M 50/244* (2021.01);
(Continued)

(58) Field of Classification Search
CPC .... H02J 7/0044; H02J 7/0045; H01M 50/204; H01M 50/244; H01M 50/247; H02M 1/425; H02M 3/33507
(Continued)

(56) References Cited

U.S. PATENT DOCUMENTS

2005/0017695 A1  1/2005  Stanley
2005/0024016 A1  2/2005  Breen et al.
(Continued)

FOREIGN PATENT DOCUMENTS

JP   2006062020 A   3/2006
JP   2011024306 A   2/2011
(Continued)

OTHER PUBLICATIONS

International Search Report and Written Opinion for Application No. PCT/US2021/024474 dated Jul. 13, 2021 (11 pages).
(Continued)

*Primary Examiner* — Zixuan Zhou
(74) *Attorney, Agent, or Firm* — Michael Best & Friedrich LLP

(57) ABSTRACT

Embodiments described herein provide a modular storage for power tool devices including a charging compartment for power tool battery packs. The modular storage includes a housing, a storage compartment in the housing, and a charger compartment in the housing including a battery pack interface configured to receive a power tool battery pack. The modular storage also includes an AC input receiving universal AC power and an active power factor correction (PFC) converter receiving AC power from the AC input and configured to convert the AC power to a high-voltage DC output. The modular storage further includes a DC-DC converter electrically connected between the active PFC converter and the battery pack interface, the DC-DC converter including an active clamp flyback converter.

17 Claims, 21 Drawing Sheets

(51) Int. Cl.
  *H01M 50/244* (2021.01)
  *H01M 50/247* (2021.01)
  *H02M 1/42* (2007.01)
  *H02M 3/335* (2006.01)
(52) U.S. Cl.
  CPC ......... *H01M 50/247* (2021.01); *H02J 7/0045* (2013.01); *H02M 1/425* (2013.01); *H02M 3/33507* (2013.01)
(58) Field of Classification Search
  USPC .......................................... 320/107, 111–112
  See application file for complete search history.

(56) References Cited

U.S. PATENT DOCUMENTS

| | | | | |
|---|---|---|---|---|
| 2014/0226367 | A1* | 8/2014 | Hu | H02M 3/3353 363/21.04 |
| 2015/0263638 | A1* | 9/2015 | Yang | H02J 7/00036 363/125 |
| 2016/0373012 | A1 | 12/2016 | Freeman et al. | |
| 2017/0047846 | A1* | 2/2017 | Teo | H02M 3/33507 |
| 2017/0229897 | A1 | 8/2017 | Ashrafzadeh | |
| 2020/0251992 | A1* | 8/2020 | Peng | H02M 3/3353 |

FOREIGN PATENT DOCUMENTS

| | | |
|---|---|---|
| JP | 2018038118 A | 3/2018 |
| JP | 2018160997 A | 10/2018 |
| JP | 2020025390 A | 2/2020 |
| WO | 2016129416 A1 | 8/2016 |

OTHER PUBLICATIONS

Japanese Patent Office Action for Application No. 2022-558210 dated Oct. 31, 2023 (10 pages including machine English translation).

* cited by examiner

MODULAR STORAGE UNIT WITH CHARGER FOR POWER TOOL BATTERY PACKS

RELATED APPLICATIONS

This application claims the benefit of U.S. Provisional Patent Application No. 63/000,688, filed on Mar. 27, 2020, the entire content of which is hereby incorporated by reference.

SUMMARY

Embodiments described herein provide a modular storage for power tool devices including a charging compartment for power tool battery packs.

One embodiment provides a charger for power tool battery packs including a battery pack interface configured to receive a power tool battery pack and an AC power input for receiving input AC power. The charger also includes a converter for converting AC power at the AC power input to high-voltage DC output, and a DC-DC converter connected between the converter and the battery pack interface. The DC-DC converter includes an active clamp (AC) flyback topology and is configured to convert the high-voltage DC output to a charging DC power provided to the battery pack interface.

Another embodiment provides a charger for power tool battery packs including a housing, a charging circuit in the housing and a battery pack interface configured to receive a power tool battery pack. The charger also includes a power cord receiving alternating current (AC) input; and an active power factor correction (PFC) converter receiving AC power from the power cord and configured to convert the AC power to a high-voltage DC output. The charger further includes a DC-DC converter electrically connected between the active PFC converter and the battery pack interface, the DC-DC converter including an active clamp (AC) flyback converter.

Another embodiment provides a charger including a housing, a charging circuit in the housing, and a battery pack interface configured to receive a power tool battery pack. The modular storage unit also includes a power cord receiving alternating current (AC) input, an active power factor correction (PFC) converter receiving AC power from the power cord and configured to convert the AC power to a high-voltage DC output, and a DC bus receiving the high-voltage DC output. The modular storage unit further includes a housekeeping power supply, a universal serial bus (USB) charging power supply, and a DC-DC converter connected between the DC bus and the battery pack interface. The DC bus routes the high-voltage DC output to the housekeeping power supply, the USB charging power supply, and the DC-DC converter.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
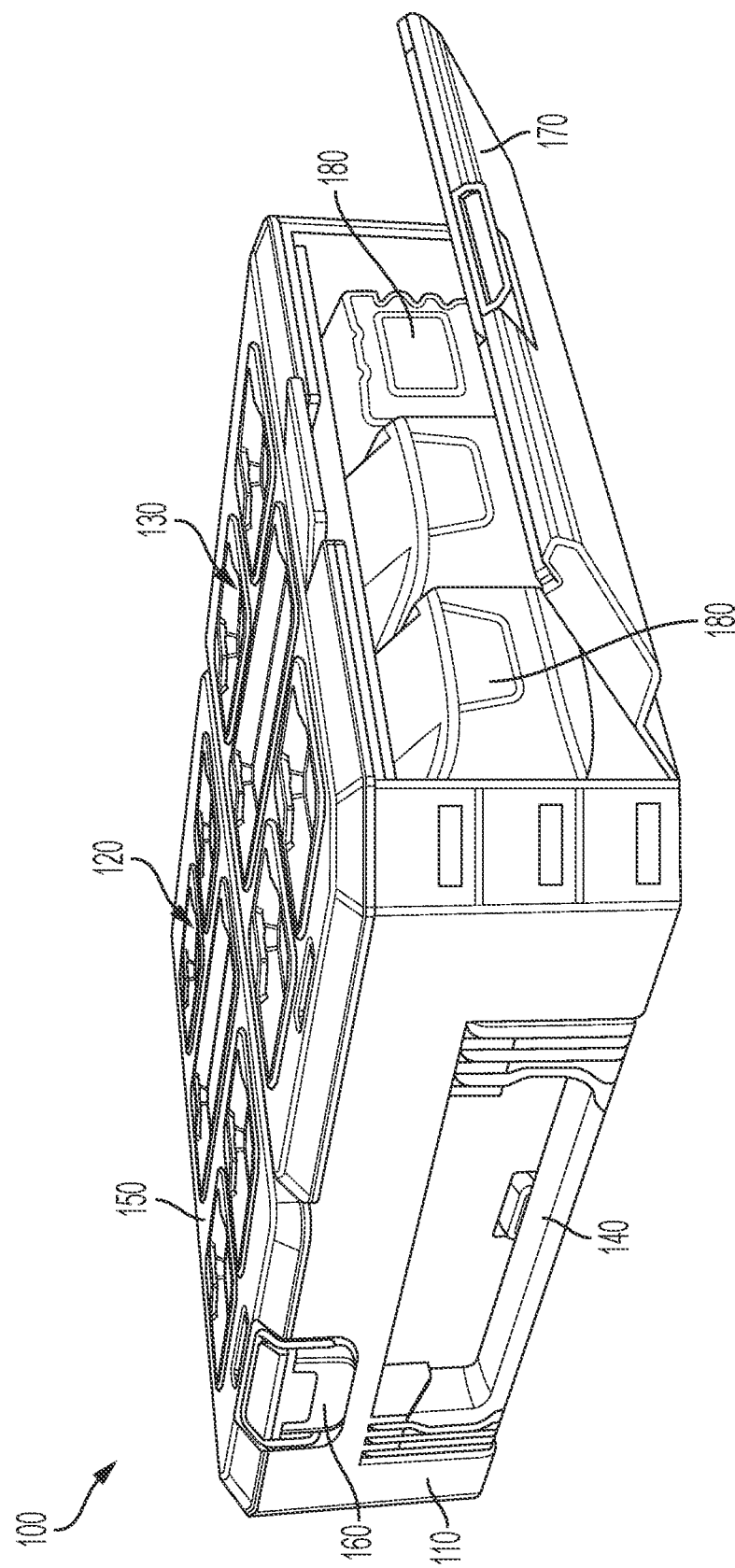
FIG. 1 is a front perspective view of a modular storage unit with an open charger lid in accordance with some embodiments.
Figure 2:
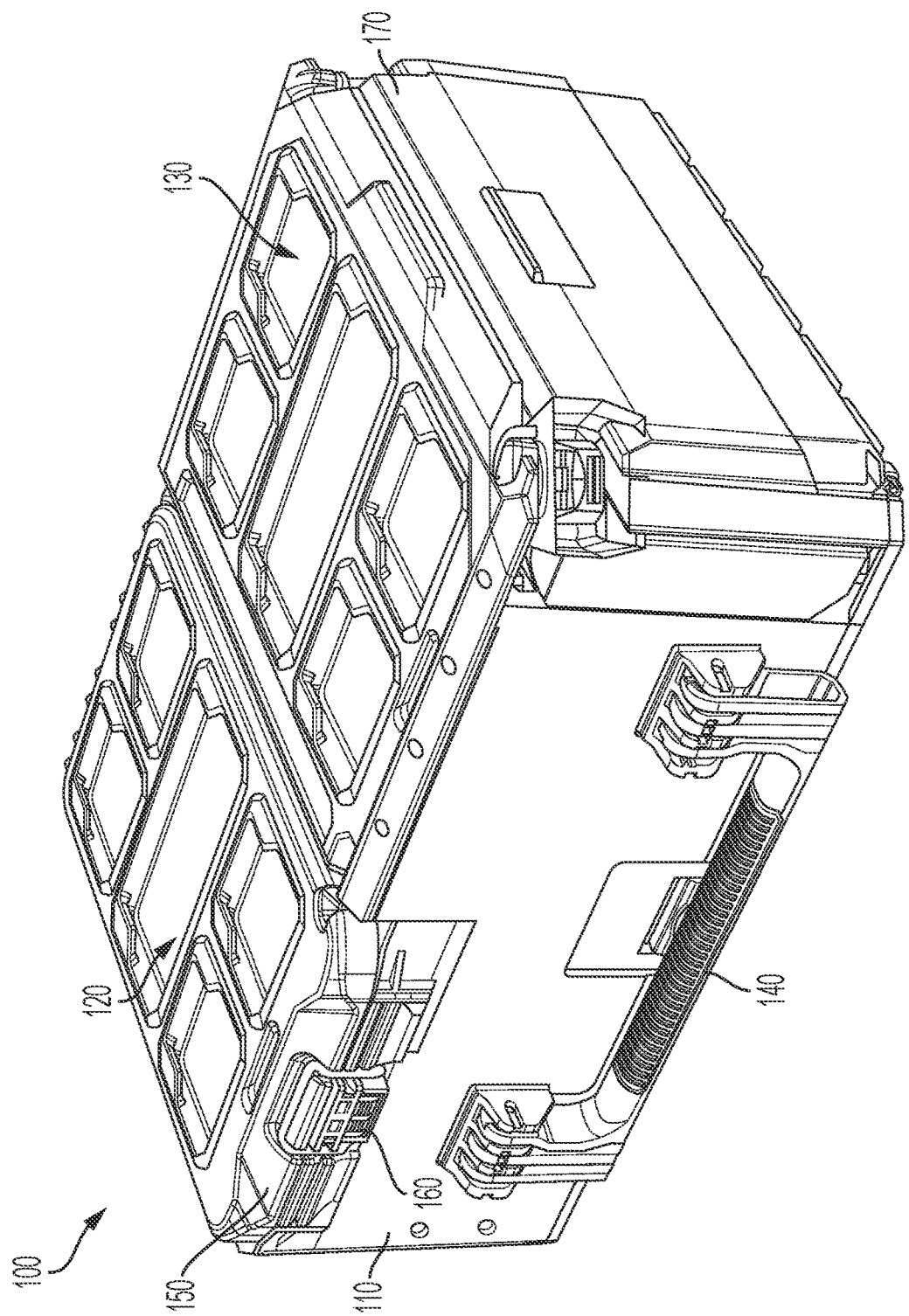
FIG. 2 is a front perspective view of the modular storage unit of FIG. 1 in accordance with some embodiments.
Figure 3:
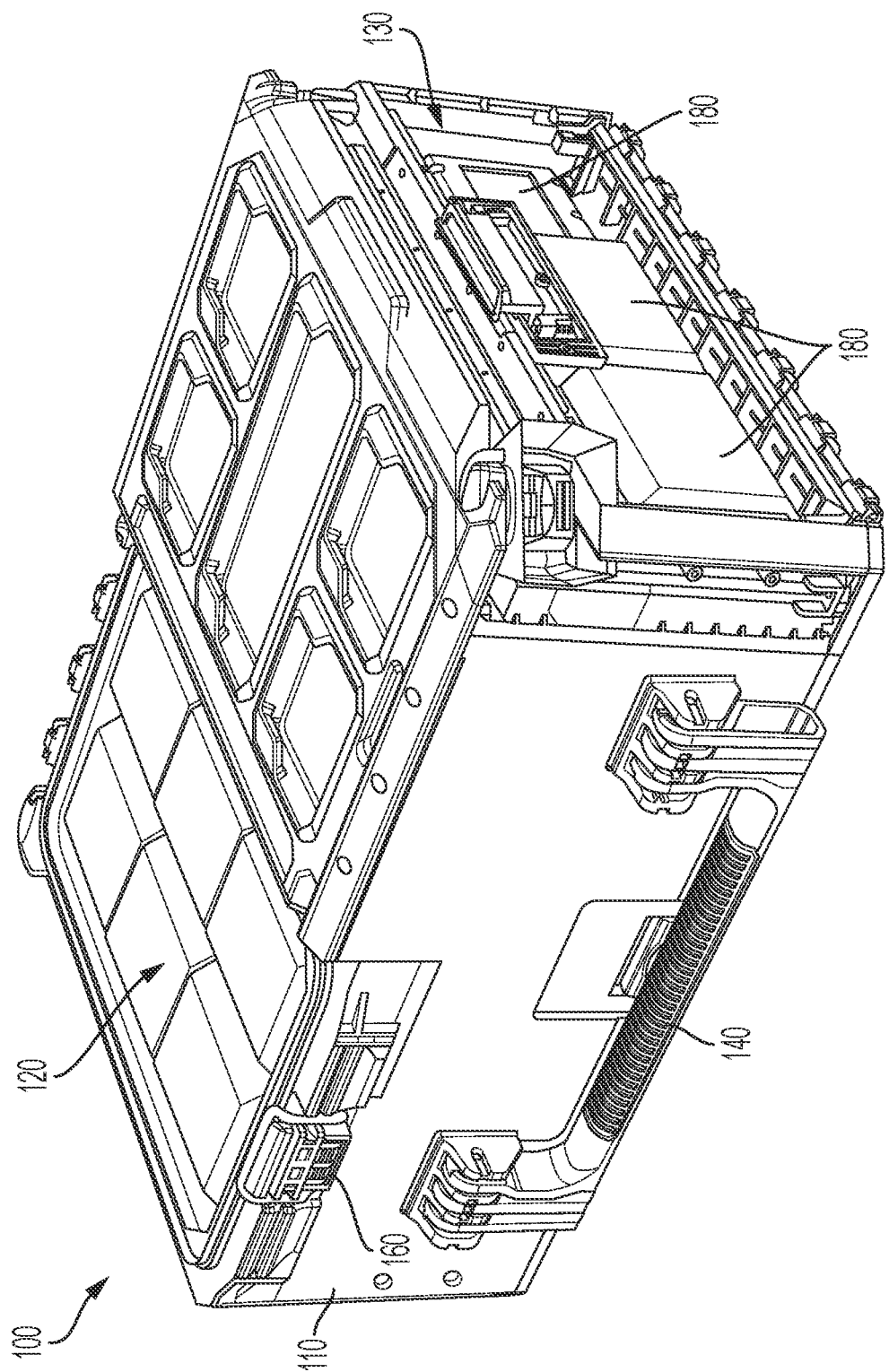
FIG. 3 is a front perspective view of the modular storage unit of FIG. 1 with a charger lid removed in accordance with some embodiments.
Figure 4:
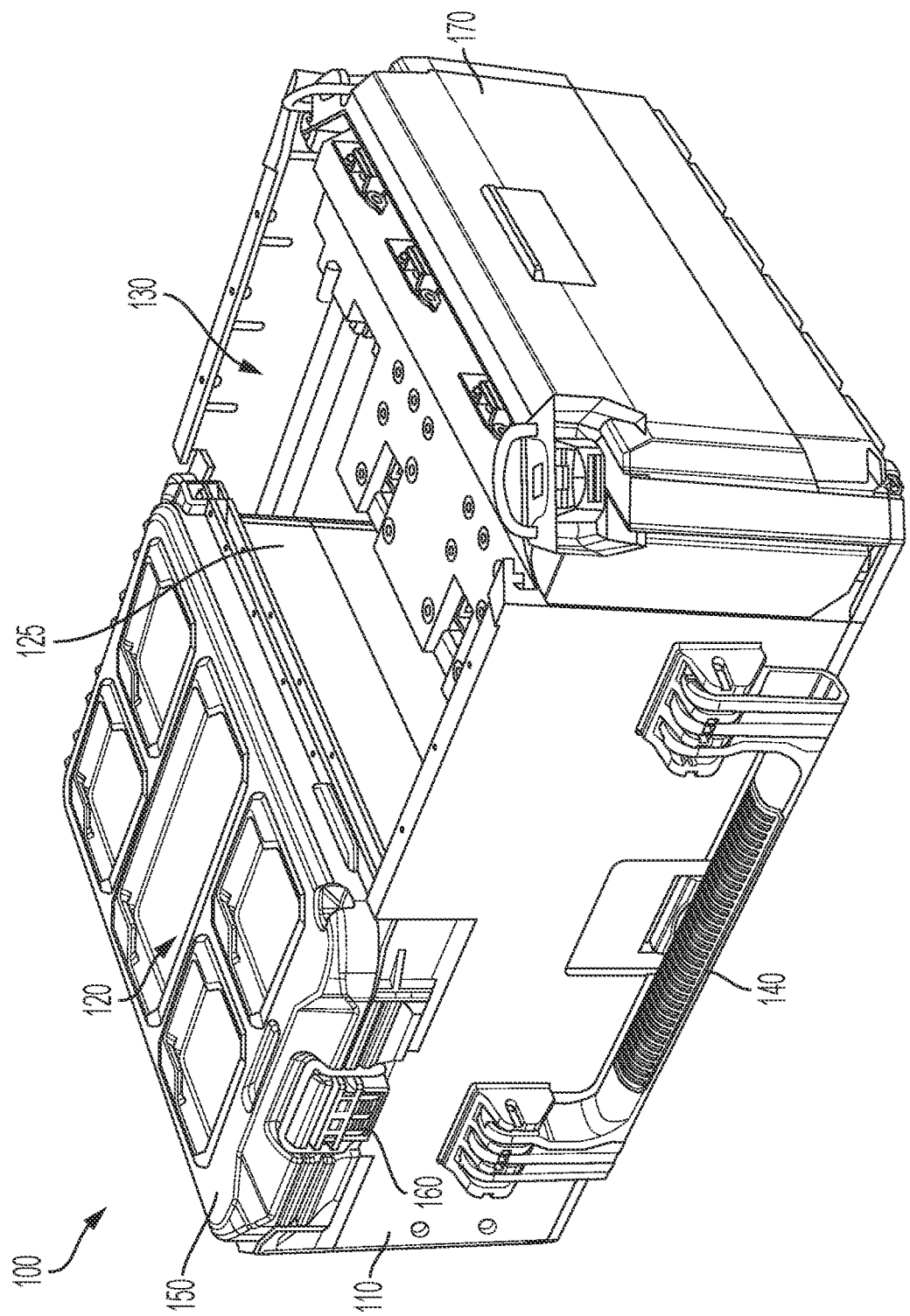
FIG. 4 is a front perspective view of the modular storage unit of FIG. 1 with a top housing removed in accordance with some embodiments.
Figure 5:
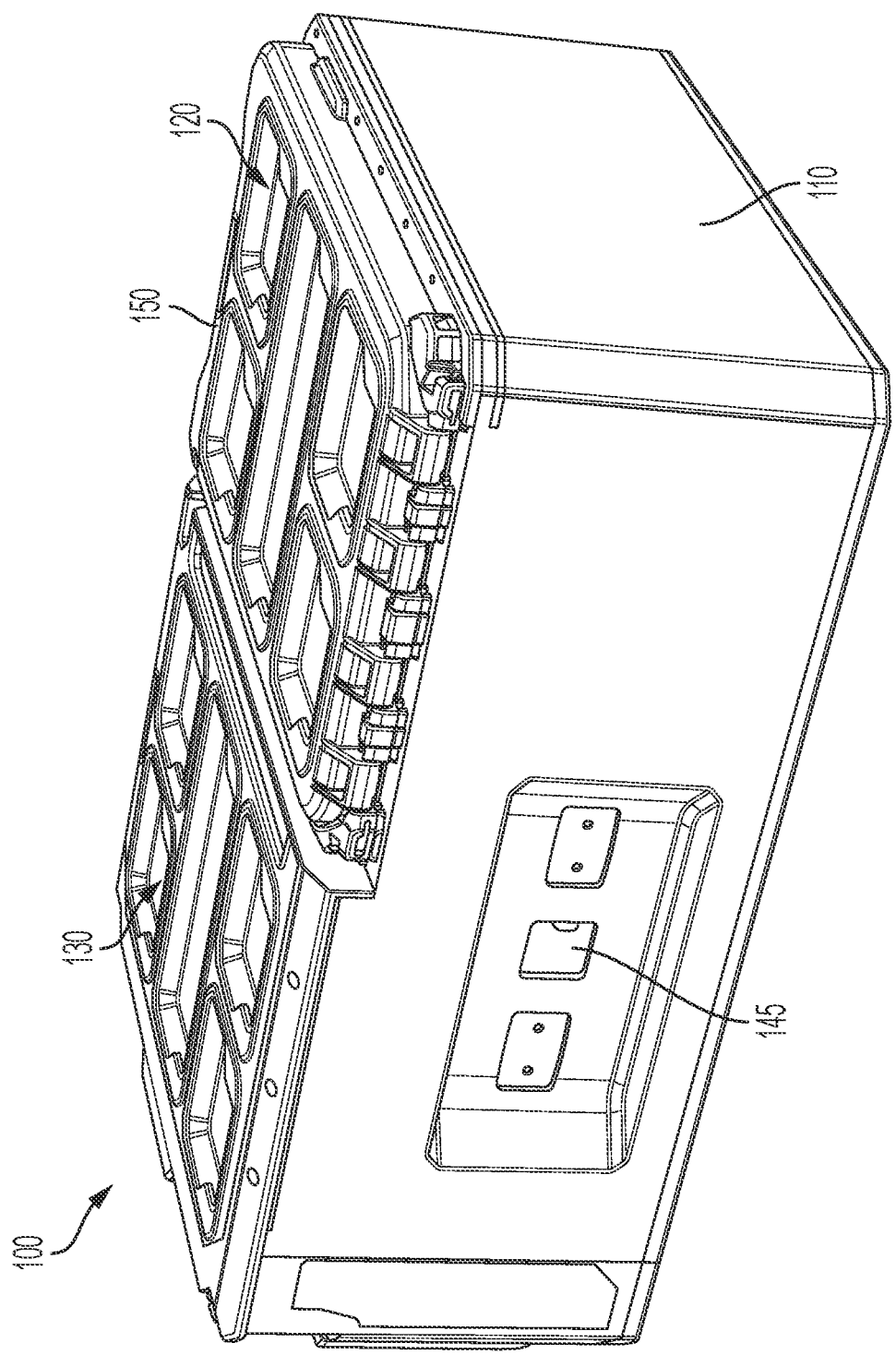
FIG. 5 is a rear perspective view of the modular storage unit of FIG. 1 in accordance with some embodiments.
Figure 6:
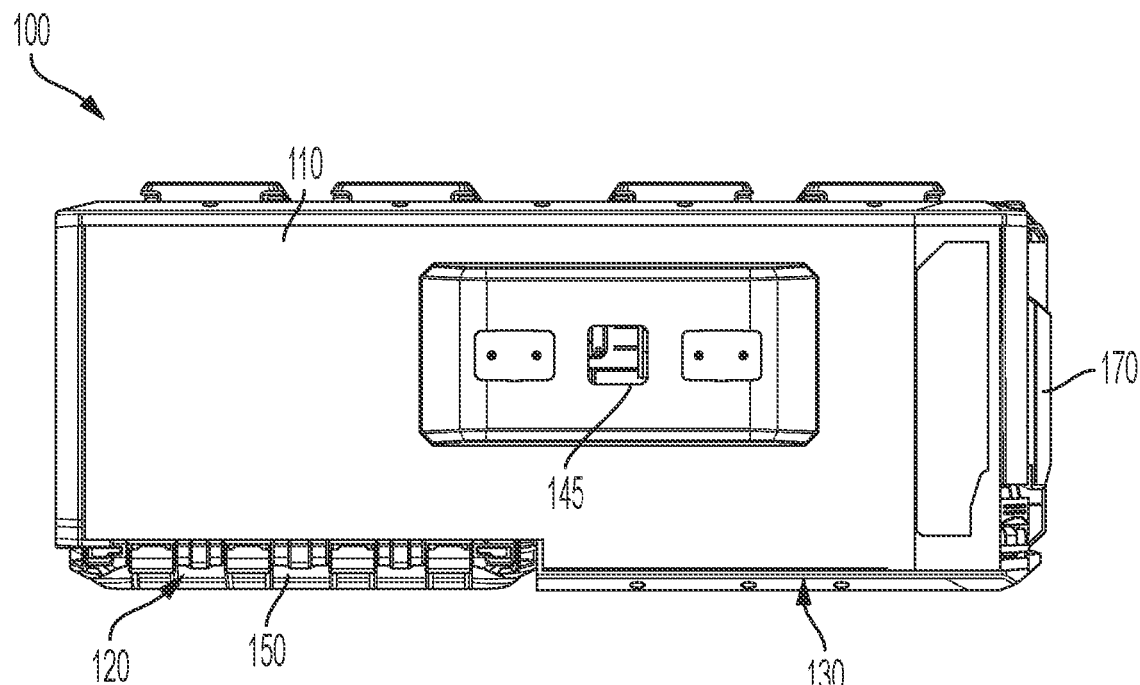
FIG. 6 is a rear plan view of the modular storage unit of FIG. 1 in accordance with some embodiments.
Figure 7:
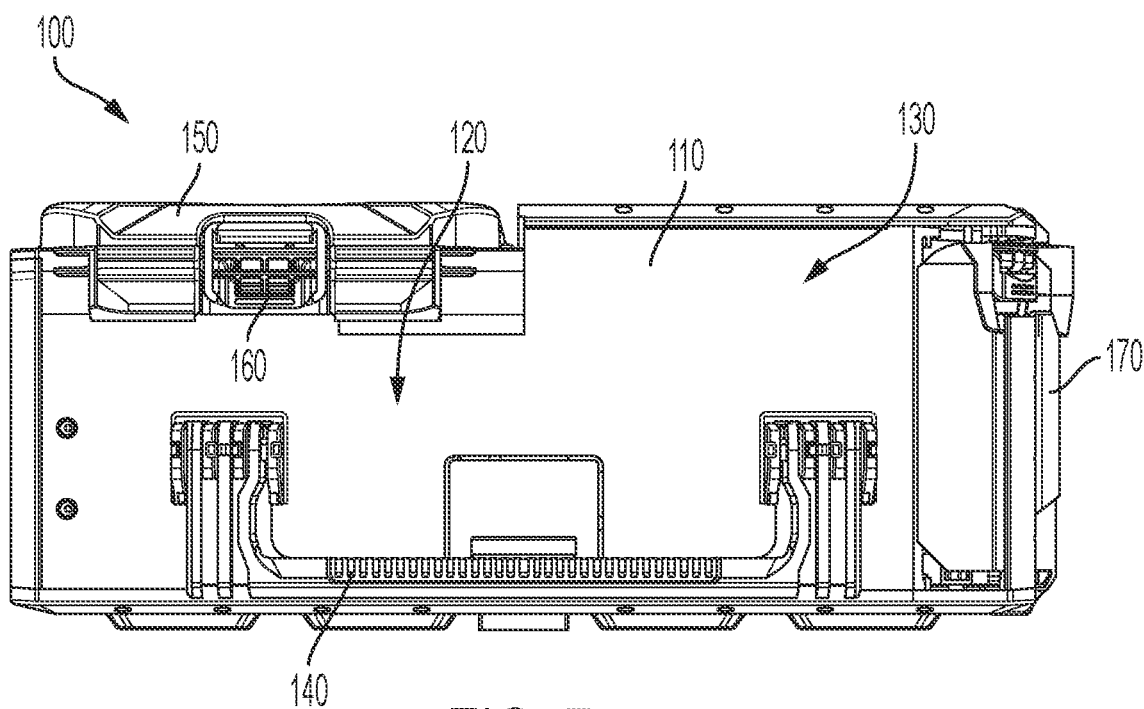
FIG. 7 is a front plan view of the modular storage unit of FIG. 1 in accordance with some embodiments.
Figure 8:
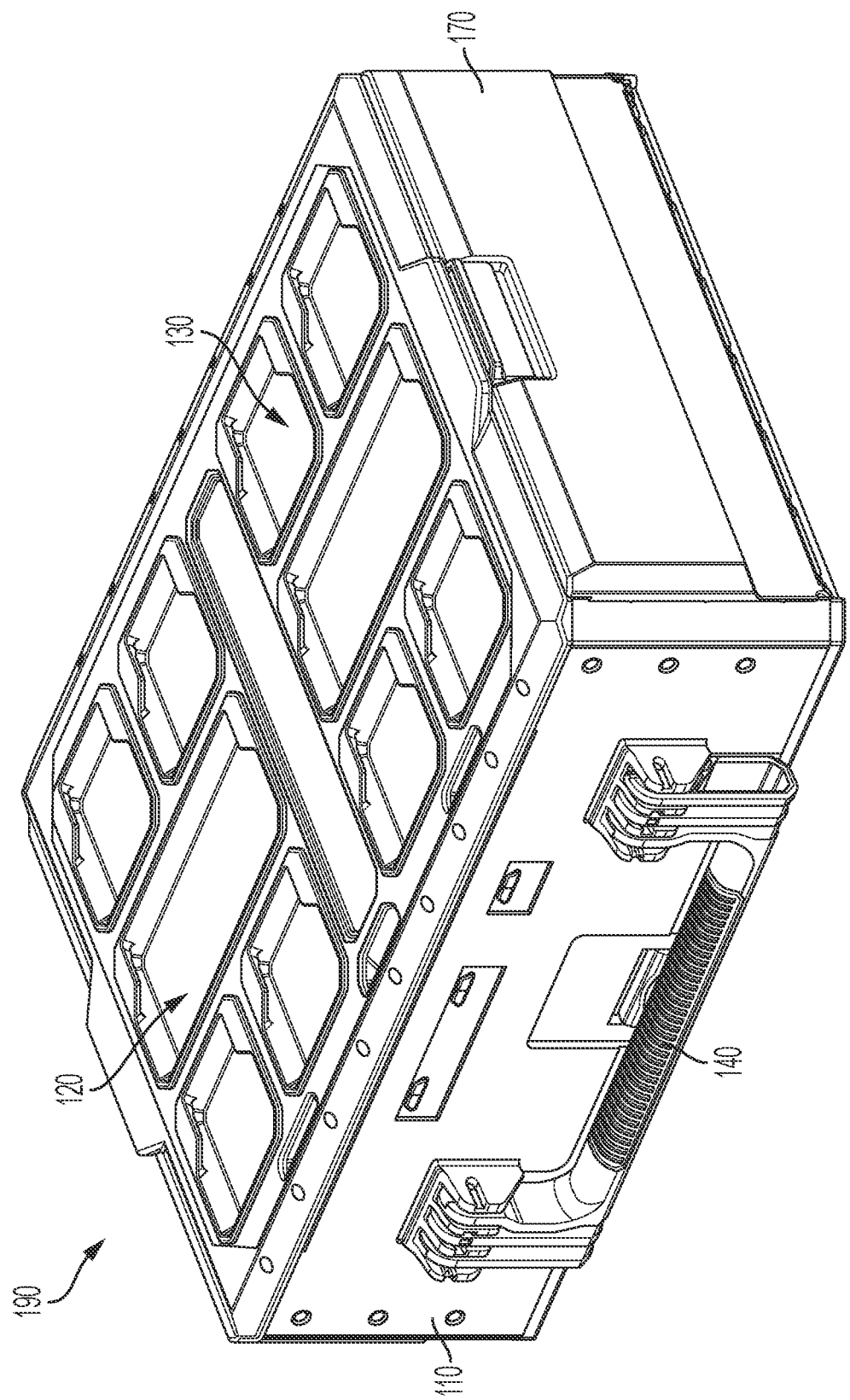
FIG. 8 is a front perspective view of a modular storage unit in accordance with some embodiments.
Figure 9:
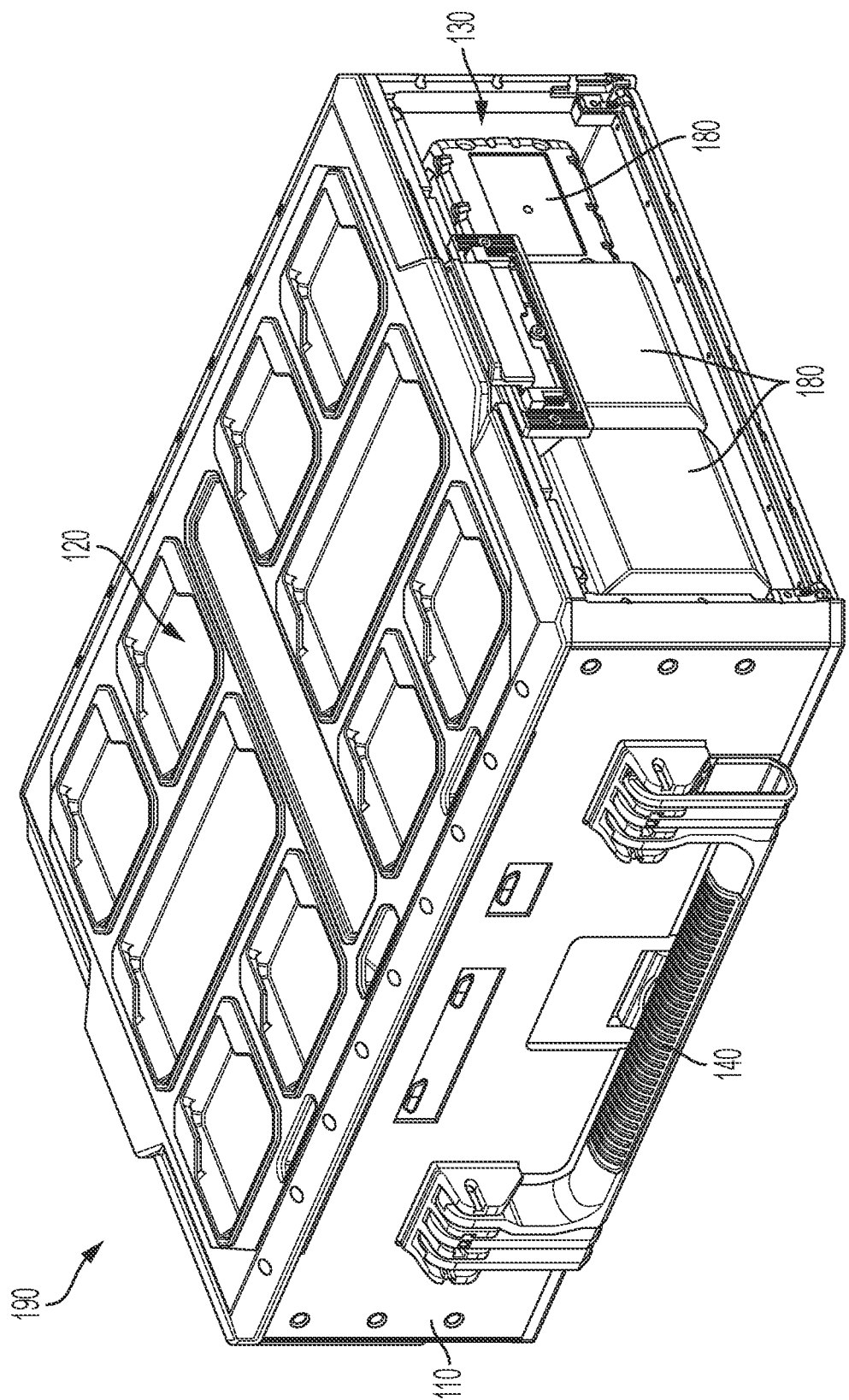
FIG. 9 is a front perspective view of the modular storage unit of FIG. 8 with a charger lid removed in accordance with some embodiments.
Figure 10:
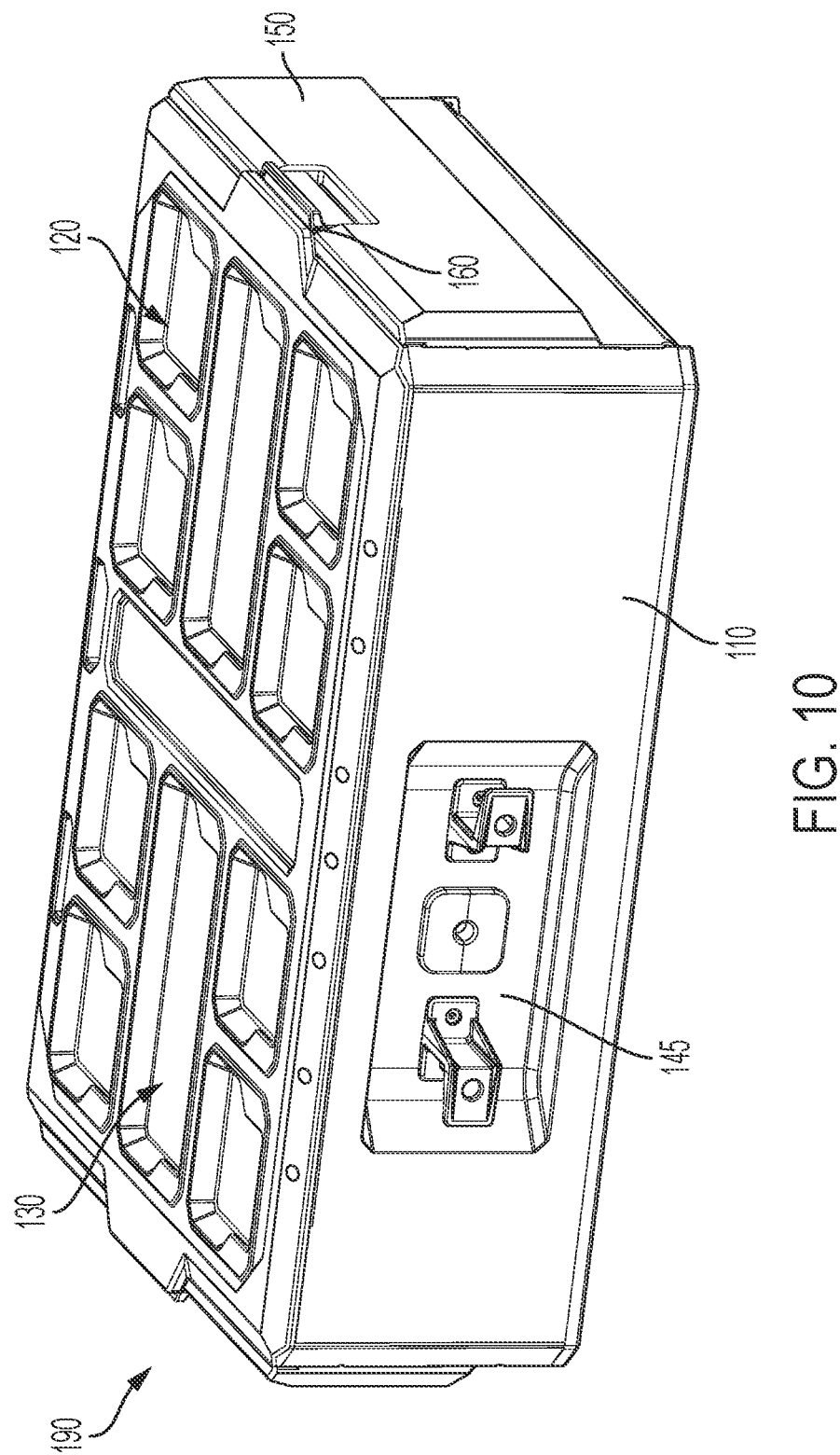
FIG. 10 is a rear perspective view of the modular storage unit of FIG. 8 in accordance with some embodiments.
Figure 11:
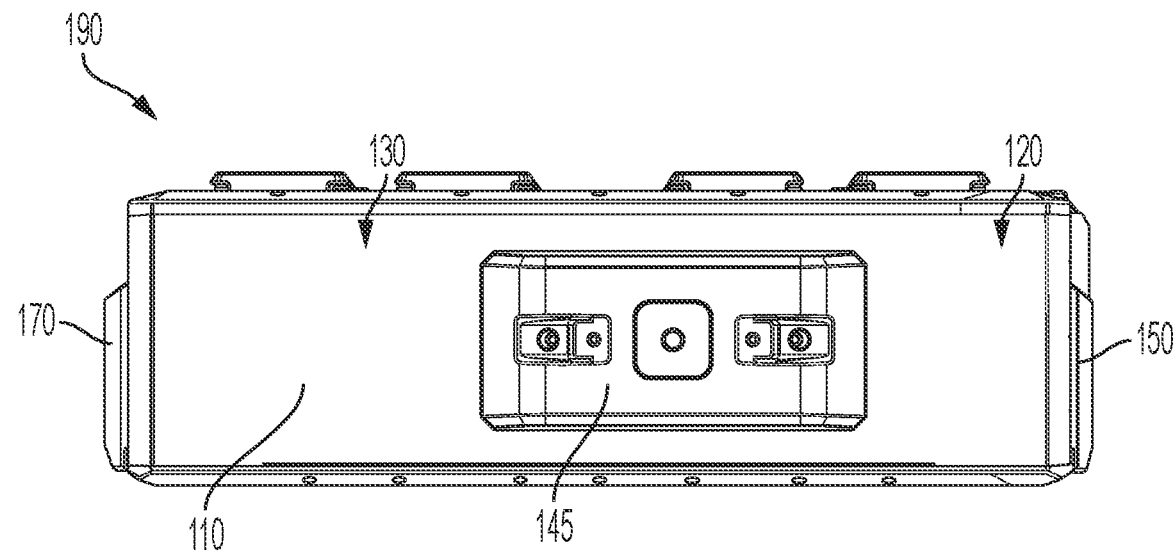
FIG. 11 is a rear plan view of the modular storage unit of FIG. 8 in accordance with some embodiments.
Figure 12:
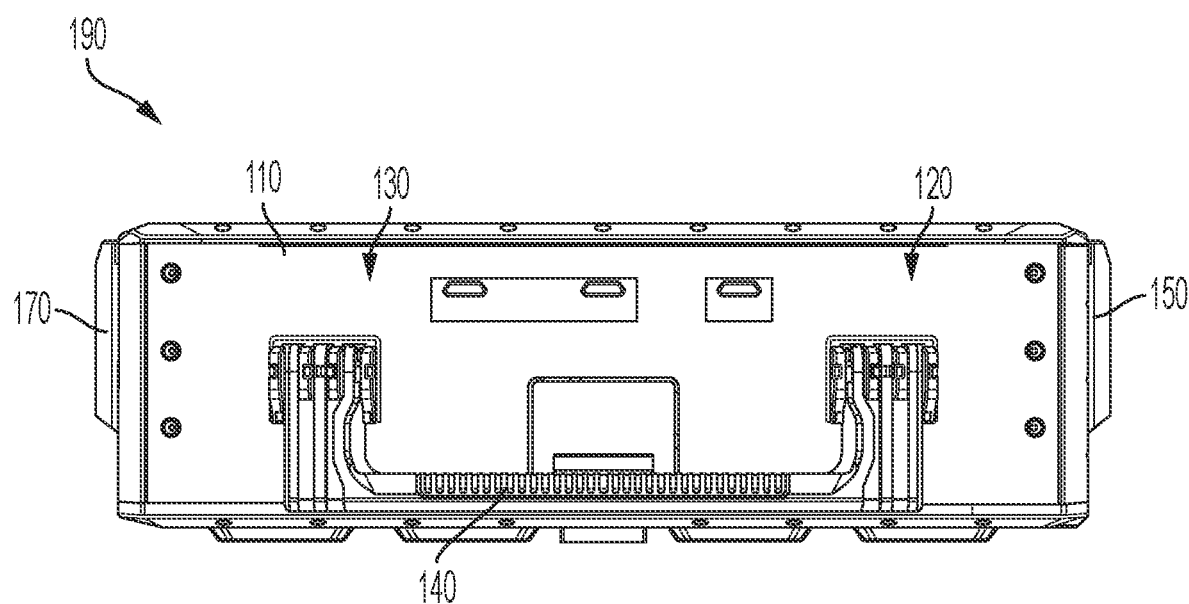
FIG. 12 is a front plan view of the modular storage unit of FIG. 8 in accordance with some embodiments.
Figure 13:
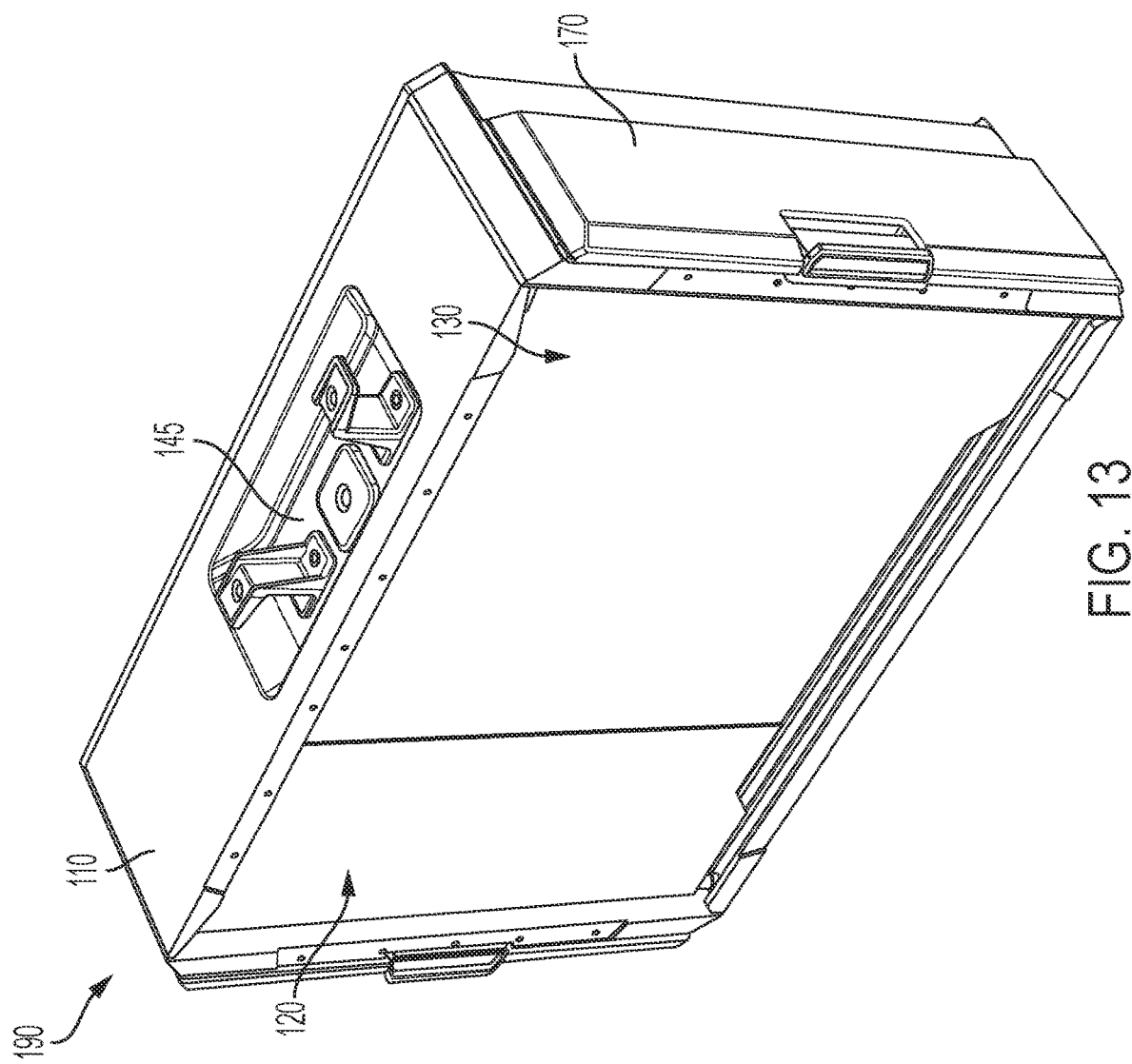
FIG. 13 is a perspective view of the modular storage unit of FIG. 8 with a top housing removed in accordance with some embodiments.

Referring to FIGS. 1-7, a modular storage unit 100 includes a housing 110 having a storage compartment 120 and a charger compartment 130. The storage compartment 120 is used for storing power tool devices, tool bits, and power tool accessories. The charger compartment 130 receives one or more power tool battery packs and is configured to charge the power tool battery packs. The modular storage unit 100 includes a handle 140 provided on a side of the housing 110. The handle 140 is pivotable from the housing 110 such that the handle 140 can be pivoted into the housing 100 when the handle 140 is not in use and can be pivoted out of the housing 100 for a user to carry the modular storage unit 100. The modular storage unit also includes a power cord receiving portion 145 provided on a side of the housing 110 that is opposite the side on which the handle 140 is provided.

The storage compartment 120 includes a storage lid 150 provided at a top of the housing 110 such that the storage lid 150 can be pivoted about the rear of the storage compartment 120 to place storable items in the storage compartment 120 from the top of the housing 110. The storage compartment 120 is formed by the side walls of the housing 110, a separator wall 125 (shown in FIG. 4) separating the storage compartment 120 from the charger compartment 130, a bottom wall of the housing 110, and the storage lid 150. The storage lid 150 is secured to the housing 110 using a latch 160 to prevent the storage lid 150 from opening when the storage compartment 120 is being transported.

The charger compartment 130 includes a charger lid 170 provided on a side of the housing 110 such that power tool battery packs 180 may be inserted into the charger compartment 130 from the side of the housing 110. The charger lid 170 is pivotable about the housing 110 and may be secured by a mechanism provided on a top wall of the housing 110. The charger compartment 130 can receive and charge different types of battery packs 180. The charger compartment 130 includes a plurality of battery pack interfaces 185 (for example, a first battery pack interface, a second battery pack interface, and a third battery pack interface). In the example illustrated, the charger compartment 130 receives two 18 Volts (V) battery packs 180 (for example, a slidable battery pack) and one 12 V battery pack 180 (for example, a tower-style battery pack). The battery packs 180 are, for example, Milwaukee® REDLITHIUM M18™ and M12™ battery packs. In addition to charging power tool battery packs 180, the charger compartment 130 may also include DC outlets (for example, universal serial bus (type-A or type-C) outlets) to charger other devices (e.g., smartphones, tablet computers, and the like).

Referring to FIGS. 8-13, a modular storage unit 190 according to another embodiment is illustrated. The modular storage unit 190 is similar to the modular storage unit 100, but with the storage lid 150 provided on a side of the housing similar to the charger lid 170. Storage items are received into the storage compartment 120 through a side of the housing 110. In FIGS. 1-13, a full-stack embodiment is disclosed. However, the storage module 110 may also have a half-stack configuration with the charger compartment 130 provided above the storage compartment or vice versa. The half-stack configuration may have half the footprint of the full stack configuration, but with twice the height.

Figure 14:
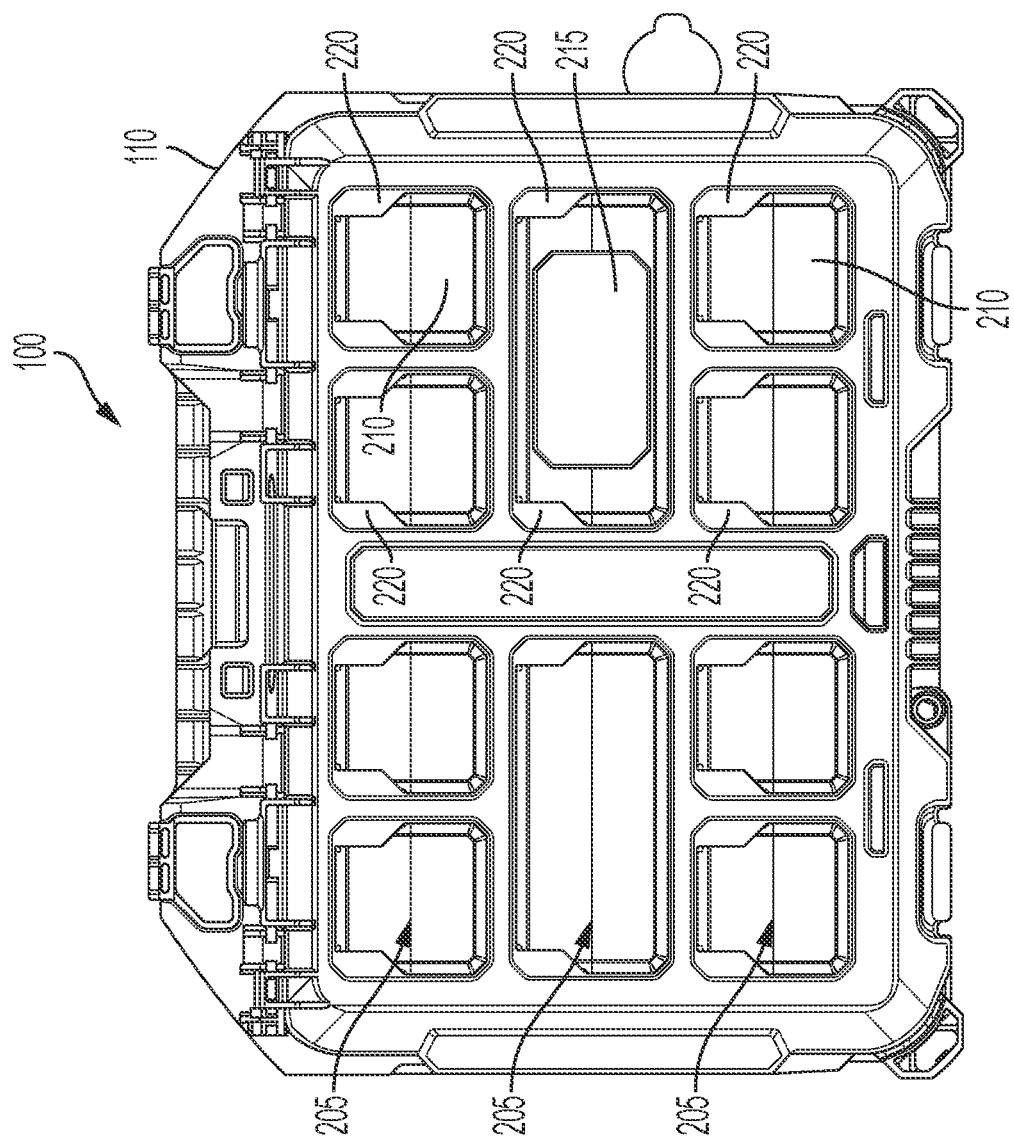
FIG. 14 is a top plan view of the modular storage unit of FIGS. 1 and 8 in accordance with some embodiments.
Figure 15:
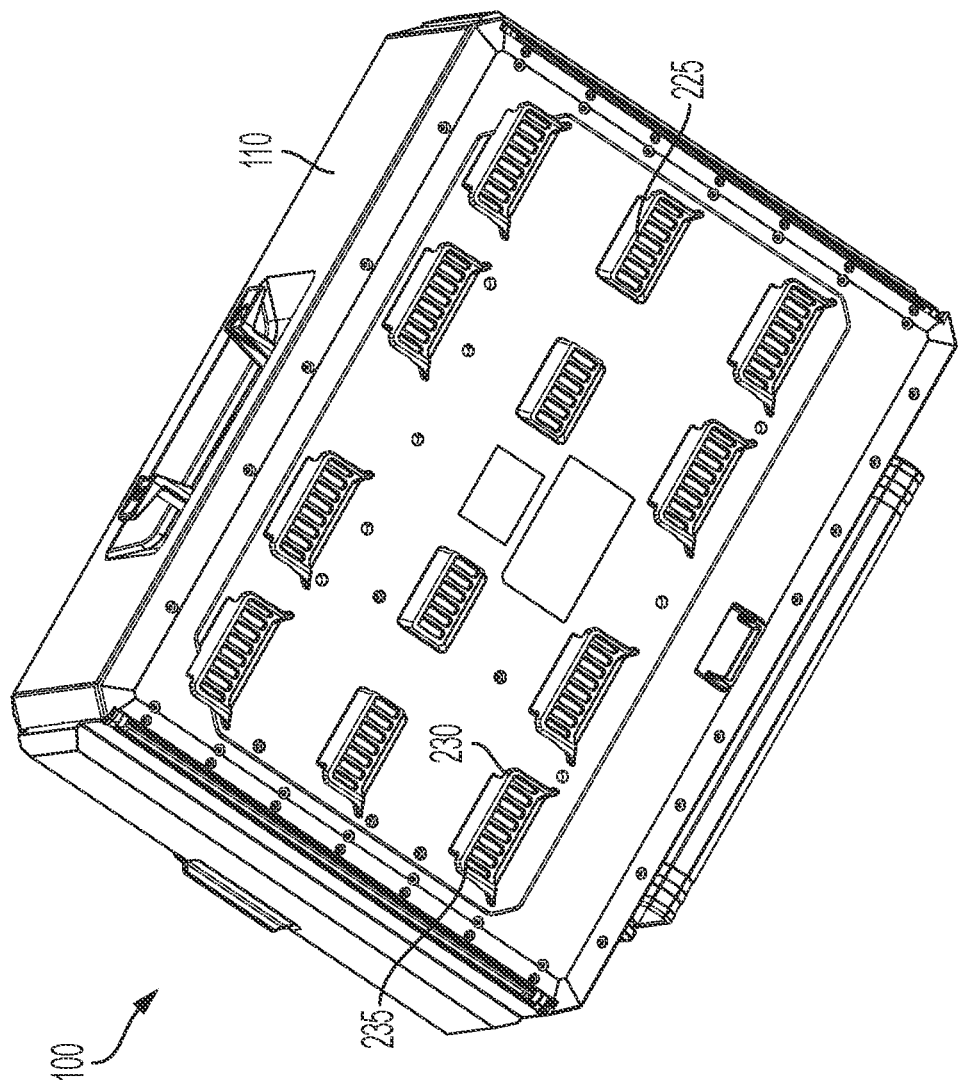
FIG. 15 is a bottom perspective view of the modular storage unit of FIGS. 1 and 8 in accordance with some embodiments

With reference to FIG. 14, the storage module 100 includes a plurality of connection recesses 205 provided on a top of the housing 110 that receive and cooperate with projections from a complementary interface (see FIG. 15). The connection recesses 205 include two rows of two small recesses 210 and one row of large recess 215. In other embodiments, the top of the housing 110 can include different numbers or patterns of connection recesses 205. An interference projection or wing 220 extends into each connection recess 205 on opposite sides of the connection recess 205 from one end of the connection recess 205. Each of the wings 220 has a length that extends approximately half the connection recess 205 to define a first portion of the connection recess 205 and a second portion opposite the wings 220, which remains open. In some embodiments, each of the wings 220 has a length that extends less than half the connection recess 205.

With reference to a storage module 100 having a bottom of the housing 110 as illustrated in FIG. 15, the second portion of each connection recess 205 is sized to receive a projection 225. When the projections 225 are received in the connection recesses 205, a bottom surface of the housing 110 is arranged to contact and be supported by a top surface of the housing 110. In the illustrated embodiment, each projection 225 extends from the bottom surface of the housing 110 and is configured to cooperate with a connection recess 205 and connect the storage module 100 to another storage module with or without a charger compartment. In the illustrated embodiment, each projection 225 is formed integrally with the bottom of the housing 110. Each projection 225 has a channel 230 on each side of the projection 225. Each channel 230 has a front, open end and a back, closed end along an axis. Each projection 225 has a planar surface 235 with a generally rectangular shape. In other embodiments, the planar surface 235 may be another shape (e.g., circular, triangular, etc.). The projections 225 are arranged such that the storage module 100 can be supported on a surface by the projections 225 through contact with the planar surfaces 235.

Each of the wings 220 of the connection recesses 205 corresponds to and is configured to cooperate with a corresponding one of the channels 230 of the projection 225 received by the respective connection recess 205. In the disconnected position, the projections 225 are oriented within the connection recesses 205 such that the open ends of the channels 230 are nearer to the wings 220 than the closed ends. Once in the disconnected position, the bottom of the housing 110 may slide relative to the top of the housing 110 of another storage module parallel the longitudinal axis in a first direction toward the wings 220 such that the wings 220 are received within the channels 230 in a second, interfaced or connected position. The wings 220 and the projections 225 engage within the connection recesses 205 to interface and connect the bottom of the housing 110 and prevent disconnection of the bottom of the housing 110 from the top of the housing 110 of another storage module, except in a second direction opposite the first direction and generally parallel to the longitudinal axis. The wings 220 and the channels 230 engage one another perpendicular to the longitudinal axis.

Figure 16:
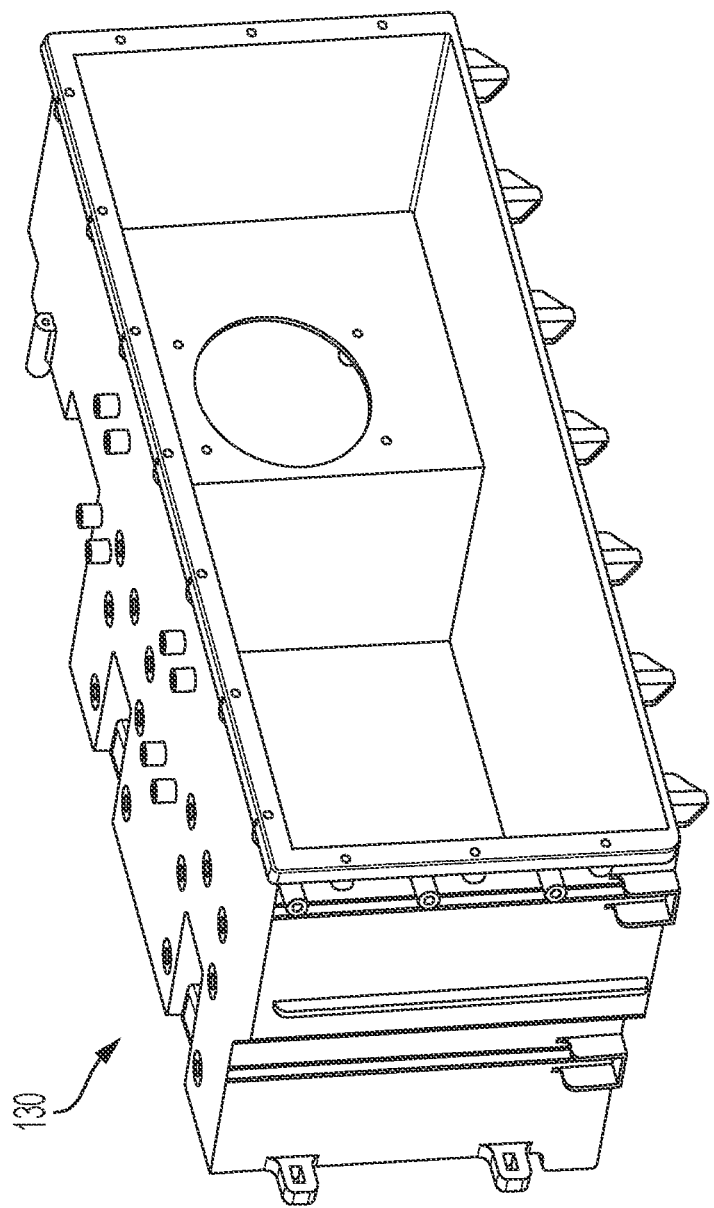
FIG. 16 is a perspective view of a charger compartment of the modular storage unit of FIGS. 1 and 8 in accordance with some embodiments.
Figure 18:
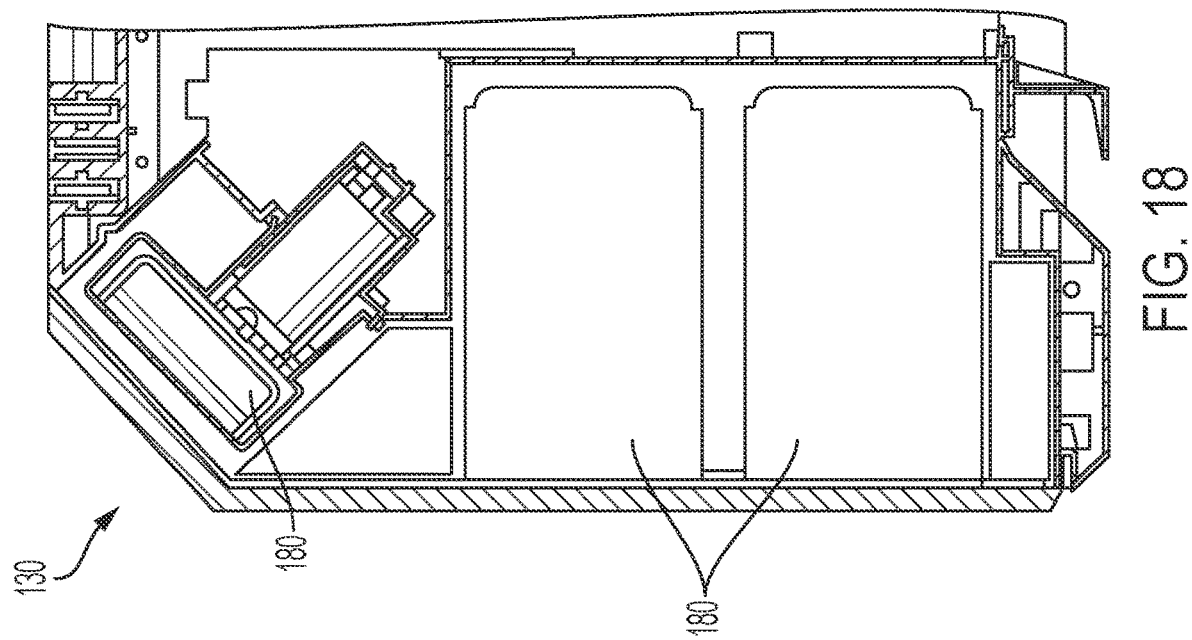
FIG. 18 is a cross-sectional view of a charger compartment of the modular storage unit of FIGS. 1 and 8 in accordance with some embodiments.
Figure 17:
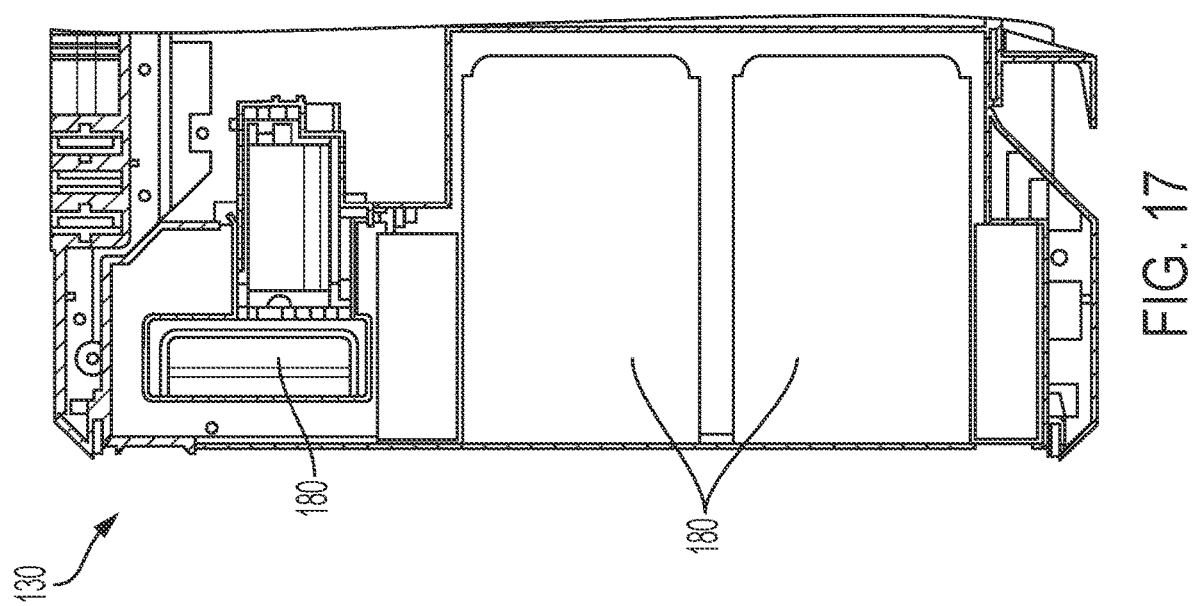
FIG. 17 is a cross-sectional view of a charger compartment of the modular storage unit of FIGS. 1 and 8 in accordance with some embodiments.

Referring to FIGS. 16-18, example configurations of the charger compartment 130 are illustrated. In a first configuration illustrated in FIG. 17, the slidable battery packs 180 and the tower-style battery pack 180 are received in the compartment along axes that are parallel to each other. In a second configuration illustrated in FIG. 18, the slidable battery packs 180 are received in the compartment along axes that are parallel to each other. However, the tower-style battery pack 180 is received along an axis that is at an angle to the axes of the slidable battery packs 180. For example, the tower-style battery pack 180 is received along an axis that is 45 degrees to the axes of the slidable battery packs 180.

Figure 19:
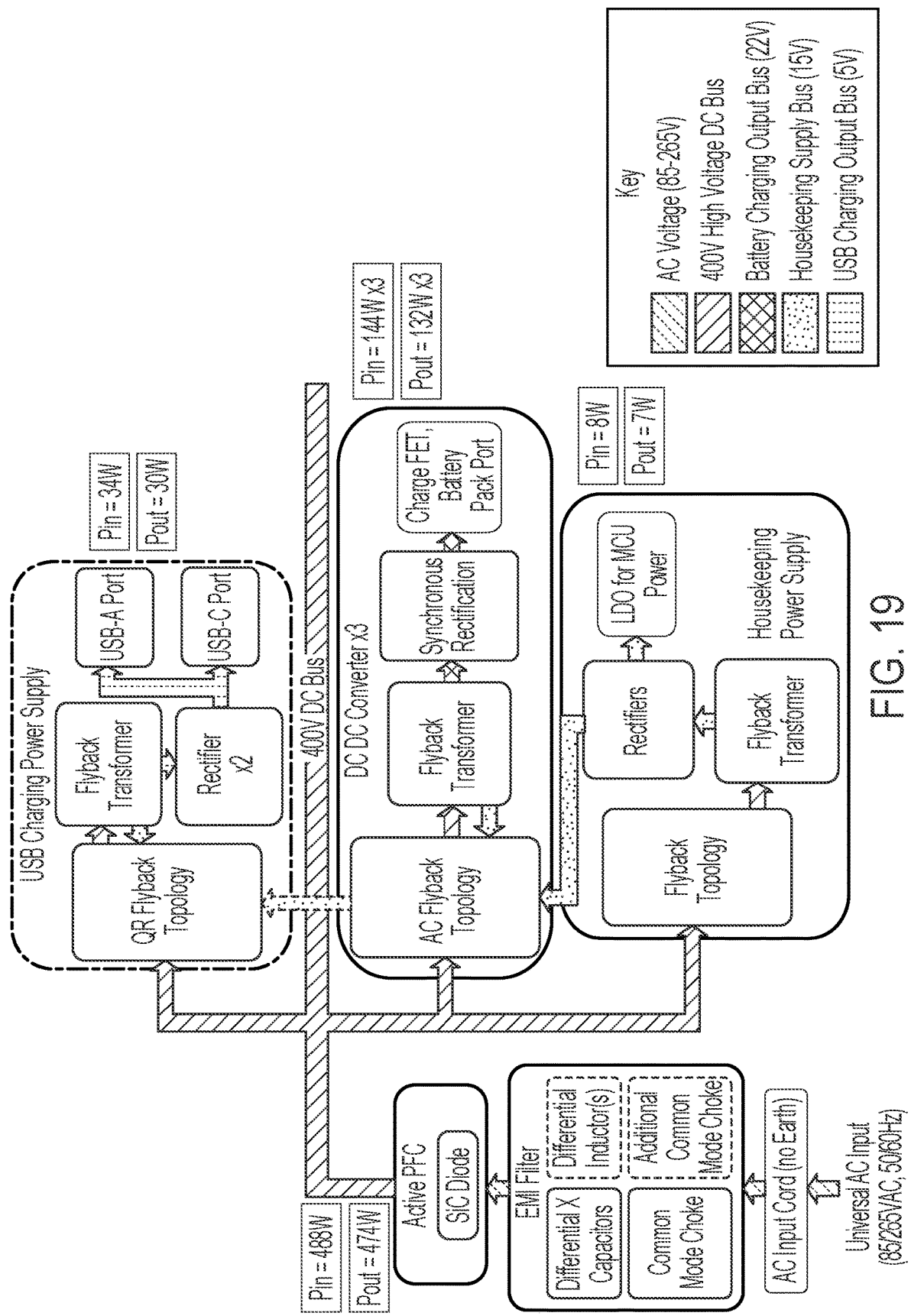
FIG. 19 is a block diagram of the storage module of FIGS. 1 and 8 in accordance with some embodiments.
Figure 20:
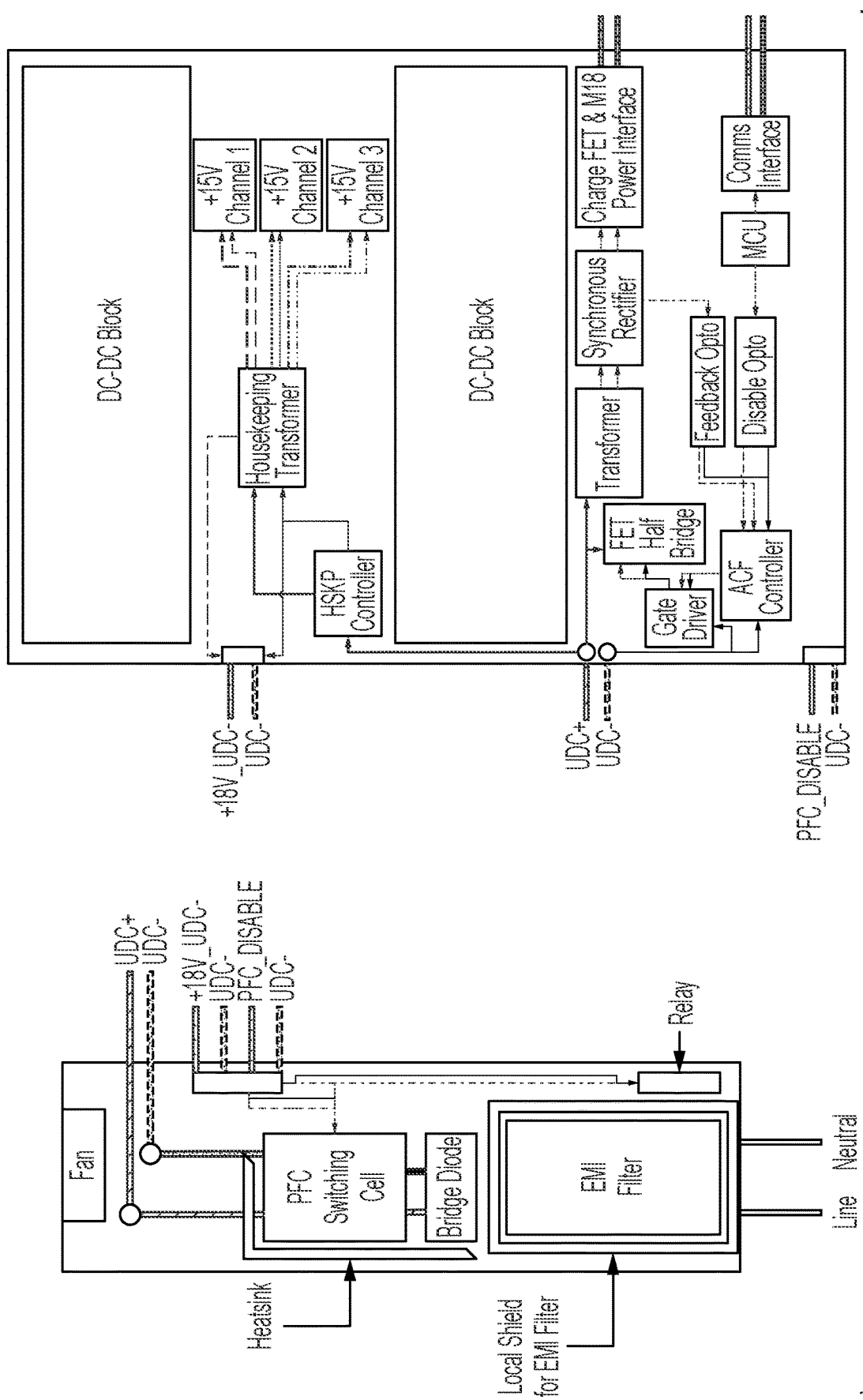
FIG. 20 illustrates a partial block diagram of the storage module of FIGS. 1 and 8 in accordance with some embodiments.

FIG. 19 is a block diagram of the storage module 100 in accordance with some embodiments. FIG. 20 illustrates a partial block diagram of the storage module 100 in accordance with some embodiments. Referring to FIGS. 19-20, the storage module 100 includes a power cord to receive universal AC input from, for example, a wall outlet. In some embodiments, the power cord may also be plugged into a portable power source powered by gas-engines or high-voltage battery packs. An electro-magnetic interference filter is provided to reduce or prevent interference between the AC power input and the DC components of the storage module. The AC power from the power cord is provided to an active power factor correction (PFC) converter (shown in FIG. 21). The active PFC converter converts the AC power input to a high-voltage DC output provided at a DC bus. In one example, the active PFC converter converts the AC power input to 400V DC output provided to the DC bus. The DC bus routes the 400V DC power to the various power converters of the storage module 100.

Figure 22:
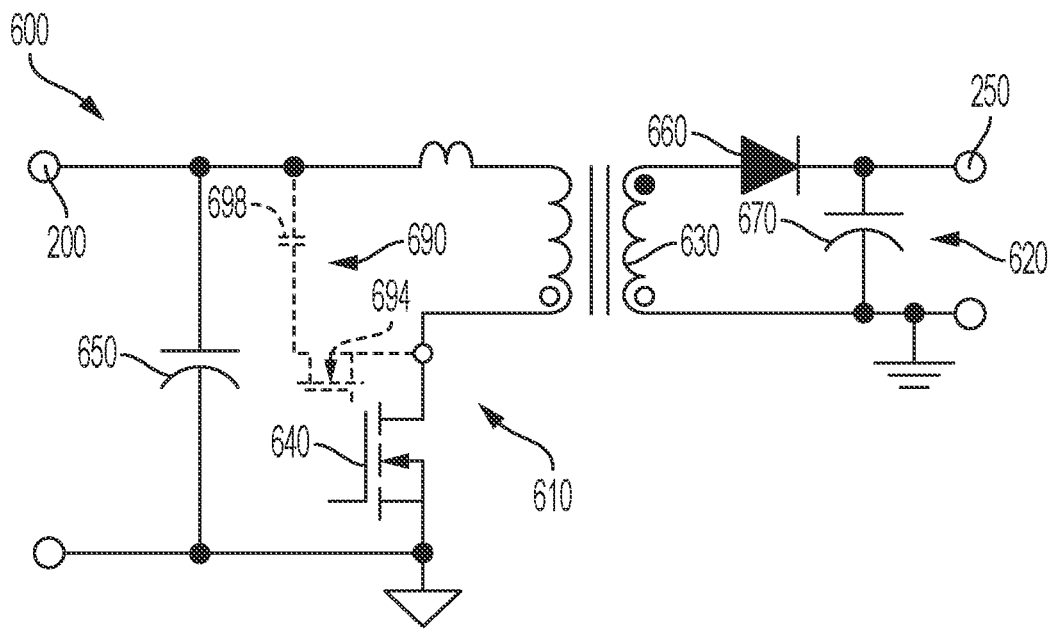
FIG. 22 is a simplified circuit diagram of an active clamp flyback converter used as a power converter in the storage module of FIGS. 1 and 8 in accordance with some embodiments.

The storage module 100 includes a housekeeping power supply, a USB charging power supply, and a plurality of DC-DC power converters. In the example illustrated, the storage module 100 includes three DC-DC power converters for charging three power tool battery packs as described above. The 400V DC power from the DC bus is provided to each of the housekeeping power supply, the USB charging power supply, and the plurality of DC-DC power converters. Each of the housekeeping power supply, the USB charging power supply, and the plurality of DC-DC power converters include power converters that convert the 400V DC power from the DC bus to various power outputs at different voltages. In one example, the power converters may be implemented using an active clamp flyback topology as illustrated in FIG. 22.

The housekeeping power supply includes a quasi-resonant (QR) flyback converter (shown in FIG. 23) for converting the 400V DC voltage to a voltage level for use by the various controllers of the storage module 100. The flyback converter includes a flyback topology coupled to a flyback transformer and a rectifier. The flyback converter converts the 400V DC voltage to, for example, 15V DC voltage for use by the various controllers of the storage module 100. The 15V DC voltage is provided to the DC-DC power converter controller, the USB charging power supply controller and other microcontrollers of the storage module 100.

The USB charging power supply includes a QR flyback converter (shown in FIG. 23) or a synchronous buck DC-DC converter for converting the 400V DC voltage to a voltage level that can be provided to the USB ports of the storage module 100. The QR flyback converter includes a QR flyback topology coupled to a flyback transformer, a first rectifier, and a second rectifier. The QR flyback converter converts the 400V DC voltage to, for example, 5V DC voltage for use by the various USB ports of the storage module 100. The first rectifier provides a 5V DC voltage to, for example, a USB type-A port and the second rectifier provides a 5V DC voltage to, for example, a USB type-C port. The USB ports can be used for charging various household devices, for example, smartphones, tablet computers, wearable devices, and the like. In some embodiments, the output from the flyback transformer of the QR flyback converter may also be used to power the controller of the USB charging power supply. In some embodiments, the USB charging power supply receives power supply from the housekeeping power supply rather than the 400V DC voltage from the DC bus. In other embodiments, the USB charging power supply receives power supply from one of the DC-DC converters rather than the 400V DC voltage from the DC bus.

The DC-DC converters includes an active clamp (AC) flyback converter (shown in FIG. 22) for converting the 400V DC voltage to a voltage level that can be provided to the power tool battery packs 180 for charging the power tool battery packs 180. The AC flyback converter includes an AC flyback topology coupled to a flyback transformer and a synchronous rectifier. A charge field effect transistor (FET) or relay is coupled between the AC flyback converter and the battery packs 180 to control the charging of the battery packs 180. The AC flyback converter converts the 400V DC voltage to, for example, 3-21V DC voltage for charging the battery packs 180 received in the storage module 100. As discussed above, the storage module includes, for example, three AC flyback converters and three charge FETs to charge three battery packs 180 received in the storage module 100.

Figure 21:
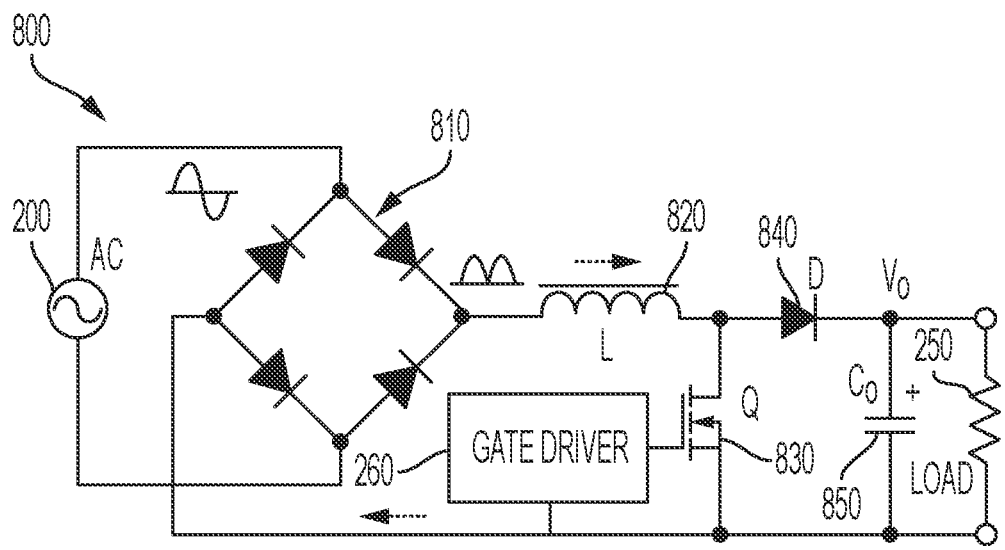
FIG. 21 is a simplified circuit diagram of a power factor correction (PFC) converter used as a power converter in the storage module of FIGS. 1 and 8 in accordance with some embodiments.

FIG. 21 illustrates one example embodiment of a power factor correction (PFC) converter 800 that can be used in the storage module 100. The PFC converter 800 includes a diode rectifier 810, an inductor 820, a converter FET 830, an output diode 840, an output capacitor 850, and a gate driver 260. The diode rectifier 810 receives AC input voltage from an AC power source, for example, the power source 200. The diode rectifier 810 rectifies the AC voltage to a rectified AC voltage at the output.

The inductor 820 is connected in series with the diode rectifier 810 to receive the rectified voltage. The output diode 840 and the output capacitor 850 are connected in series with the inductor 820. The load 250 is connected in parallel to the output capacitor 850 and in series with the output diode 840. The converter FET 830 is connected in series with the inductor 820 and in parallel to the output diode 840 and the output capacitor 850.

The gate driver 260 drives the converter FET 830 to operate the PFC converter 800. The gate driver 260 receives control signals from the electronic processor 220 to control the operation of the converter FET 830. The electronic processor 220 implements a power factor control algorithm to drive the converter FET 830 and convert AC voltage to DC voltage at the load 250. A wide bandgap FET may be used for the converter FET 830 to increase efficiency and reduce the size of the PFC circuit 800.

FIG. 22 illustrates one example embodiment of an active clamp flyback converter 600 that can be used in the DC-DC converters. The active clamp flyback converter 600 may be used as a boost or buck DC-to-DC converter. In the example illustrated, the active clamp flyback converter 600 receives power from the power source 200 and includes a primary side circuit 610 (e.g., AC flyback topology) and a secondary side circuit 620 coupled by a two winding inductor 630 (e.g., flyback transformer). The active clamp flyback converter 600 may include more or fewer components than those illustrated in FIG. 22.

The primary side circuit 610 includes a flyback switching FET 640 coupled in series with a primary side of the two winding inductor 630 and an input capacitor 650 coupled in parallel to the flyback switching FET 640 and the two winding inductor 630. The input capacitor 650 is coupled in parallel to the power source 200. The secondary side circuit 620 includes an output diode 660 and an output capacitor 670. In some embodiments, the output diode is replaced by an output FET 660. When the output diode 660 is replaced by the output FET 660, the second side circuit 620 forms a synchronous rectifier/The output FET 660 is coupled in series on a positive side of a secondary side of the two winding inductor 630 and is controlled by a synchronous rectifier controller (not shown). The output capacitor 670 is coupled in parallel to the secondary side of the two winding conductor 630 downstream of the output diode 660. A load 250 is coupled in parallel to the output capacitor 670.

The primary side circuit 610 also includes an active clamp circuit 690 including a clamp FET 694 and a clamp capacitor 698 connected in series. The clamp circuit 690 is connected in parallel with the primary side of the two winding inductor 630 and in series with the flyback switching FET 640.

During operation, the flyback switching FET 640 is turned on to store energy from the power source 200 on the two winding inductor 630. During the on-time of the flyback switching FET 640, the output capacitor 670 provides the operating power to the load 250. When the flyback switching FET 640 is turned off, the energy stored on the two winding inductor 630 is transferred to the output capacitor 670 and the load 250. The clamp FET 694 is turned on during the off state of the flyback switching FET 640 to reduce the stress on the flyback switching FET 640. In the example illustrated, a wide bandgap FET may be used for one or more of the flyback switching FET 640, the output FET 660, and the clamp FET 694 based on the desired characteristics of the DC-DC converter. Particularly, by using wide bandgap FETS, the size of the inductive and capacitor components may be reduced compared to an active clamp flyback converter using MOSFETs for the flyback switching FET 640 and the clamp FET 694. The flyback switching FET 640, the clamp FET 694, and the output FET 660 (or synchronous rectifier) are driven by a gate driver controlled by a controller of the DC-DC converter. The controller of the DC-DC converter provides control signals to a gate driver to control the operation of the flyback switching FET 640 and the clamp FET 694.

Figure 23:
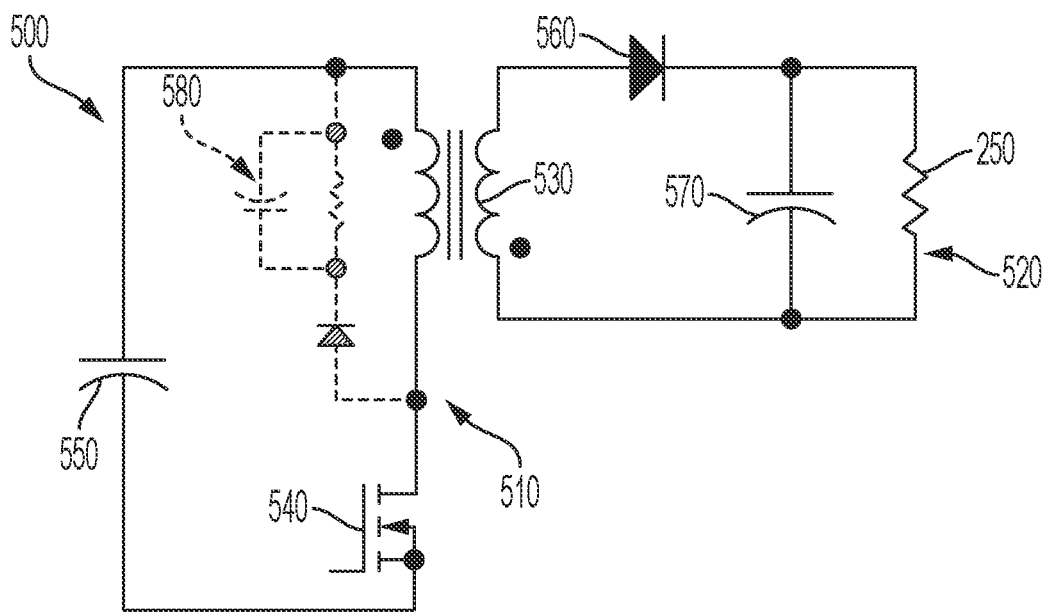
FIG. 23 is a simplified circuit diagram of a quasi-resonant flyback converter used as a power converter in the storage module of FIGS. 1 and 8 in accordance with some embodiments.

FIG. 23 illustrates one example embodiment of a QR flyback converter 500 that can be used in housekeeping power supply or the USB charging power supply. The QR flyback converter 500 may be used as a boost or buck DC-to-DC converter. In the example illustrated, the QR flyback converter 500 receives power from the power source 200 and includes a primary side circuit 510 (e.g., flyback or QR flyback topology) and a secondary side circuit 520 coupled by a two winding inductor 530 (e.g., a flyback transformer). The flyback converter 500 may include more or fewer components than those illustrated in FIG. 23.

The primary side circuit 510 includes a flyback switching FET 540 coupled in series with a primary side of the two winding inductor 530 and an input capacitor 550 coupled in parallel to the flyback switching FET 540 and the two winding inductor 530. The input capacitor 550 is coupled in parallel to the power source 200. A passive clamp resistor-capacitor-diode (RCD) snubber circuit 580 may also be provided in series with the flyback switching FET 540 and in parallel to the primary side of the two winding inductor 530. The passive clamp RCD snubber circuit limits voltage spikes on the flyback switching FET 540. The secondary side circuit 520 includes an output diode 560 and an output capacitor 570. The output diode 560 is coupled in series on a positive side of a secondary side of the two winding inductor 530. The output capacitor 570 is coupled in parallel to the secondary side of the two winding conductor 530 downstream of the output diode 560. A load 250 is coupled in parallel to the output capacitor 570.

During operation, the flyback switching FET 540 is turned on to store energy from the power source 200 on the two winding inductor 530. During the on-time of the flyback switching FET 540, the output capacitor 570 provides the operating power to the load 250. When the flyback switching FET 540 is turned off, the energy stored on the two winding inductor 530 is transferred to the output capacitor 570 and the load 250. In the example illustrated, a wide bandgap FET is used as the flyback switching FET 540 to enable high-frequency operation. The flyback switching FET 540 is driven by a gate driver 260 controlled by a controller of the housekeeping power supply or USB charging power supply. The controller provides control signals to a gate driver to control the operation of the flyback switching FET 540. In some embodiments, a wide bandgap FET may be used to replace the diode 560 to further increase the frequency of operation for the flyback converter 500.

Figure 24:
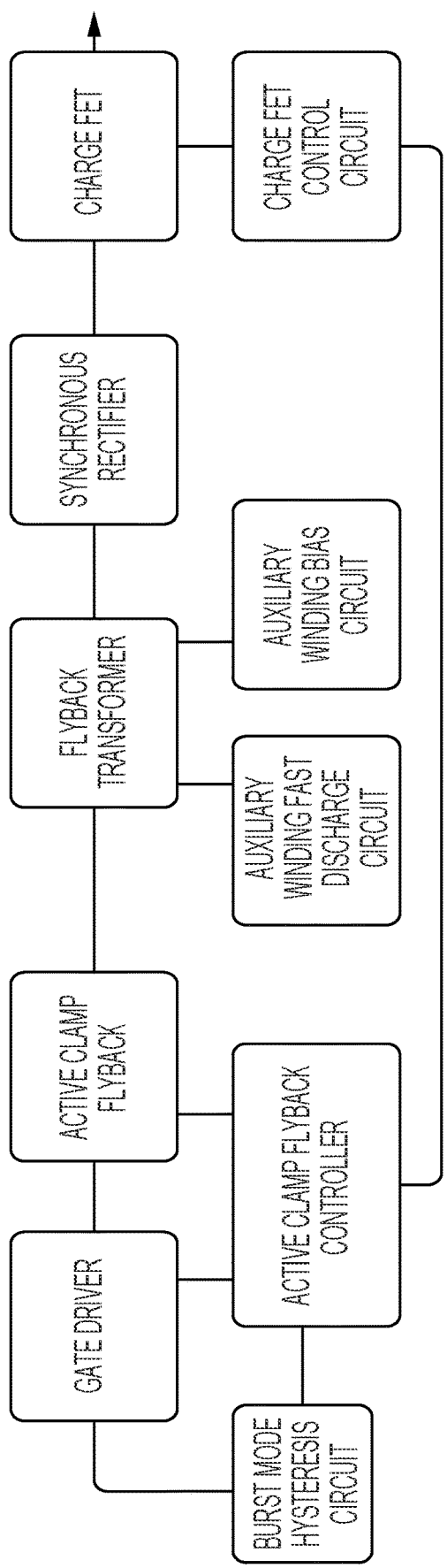
FIG. 24 is a simplified block diagram of a DC-DC converter of the storage module of FIGS. 1 and 8 including the active clamp flyback converter of FIG. 20 in accordance with some embodiments.

FIG. 24 is a simplified block diagram of a DC-DC converter of the storage module 100. The DC-DC converter includes an active clamp flyback controller, an active clamp flyback topology, a flyback transformer, a synchronous rectifier, and a charge FET. The active clamp flyback controller receives the supply voltage, for example, the 400V DC voltage from the DC bus. The active clamp flyback controller controls the active clamp flyback topology to convert the DC input voltage to a corresponding voltage and provide the DC voltage output to a battery pack 180 through the charge FET. A charge FET control circuit is provided to control the charge FET to enable and disable charging of the battery pack 180. The charge FET control circuit is controlled by a microcontroller, for example, the controller illustrated in FIG. 25.

The DC-DC converter also includes a gate driver to drive the FETs in the active clamp flyback topology. The gate driver is controlled by the active clamp flyback controller to drive the FETs of the active clamp flyback topology. A burst mode hysteresis circuit is provided to enable burst mode operation of the active clamp flyback converter. Additionally, an auxiliary winding fast discharge circuit and an auxiliary winding bias circuit are provided to control the auxiliary winding of the active clamp flyback converter.

Figure 25:
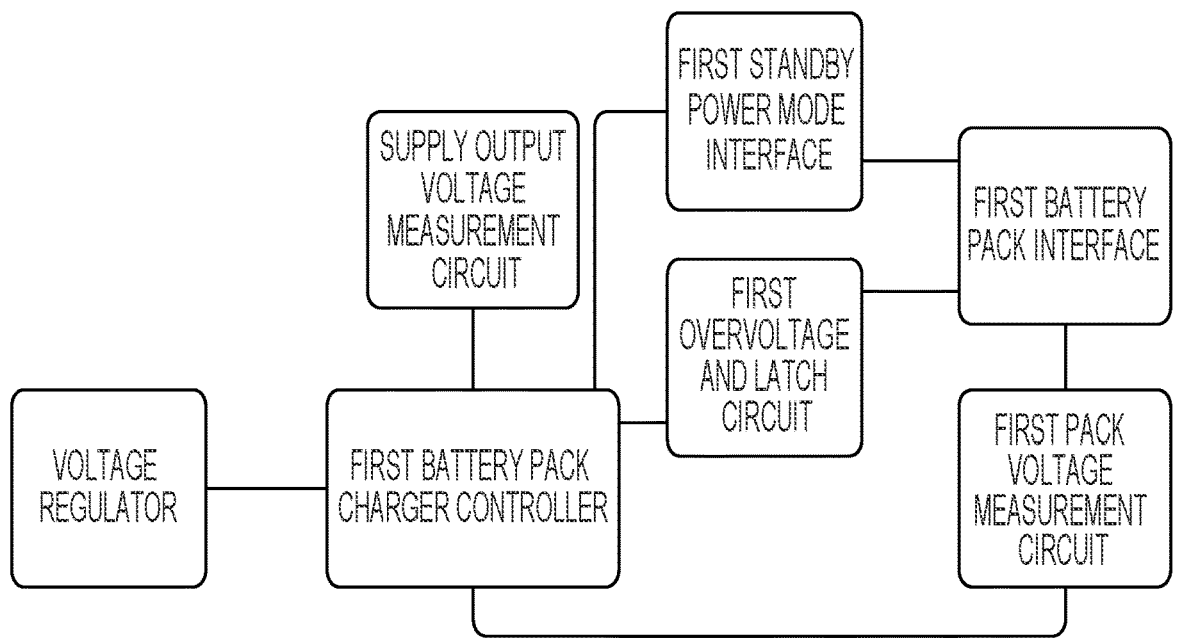
FIG. 25 is a simplified block diagram of a battery pack charging control circuit of the storage module of FIGS. 1 and 8 in accordance with some embodiments.
Figure 26:
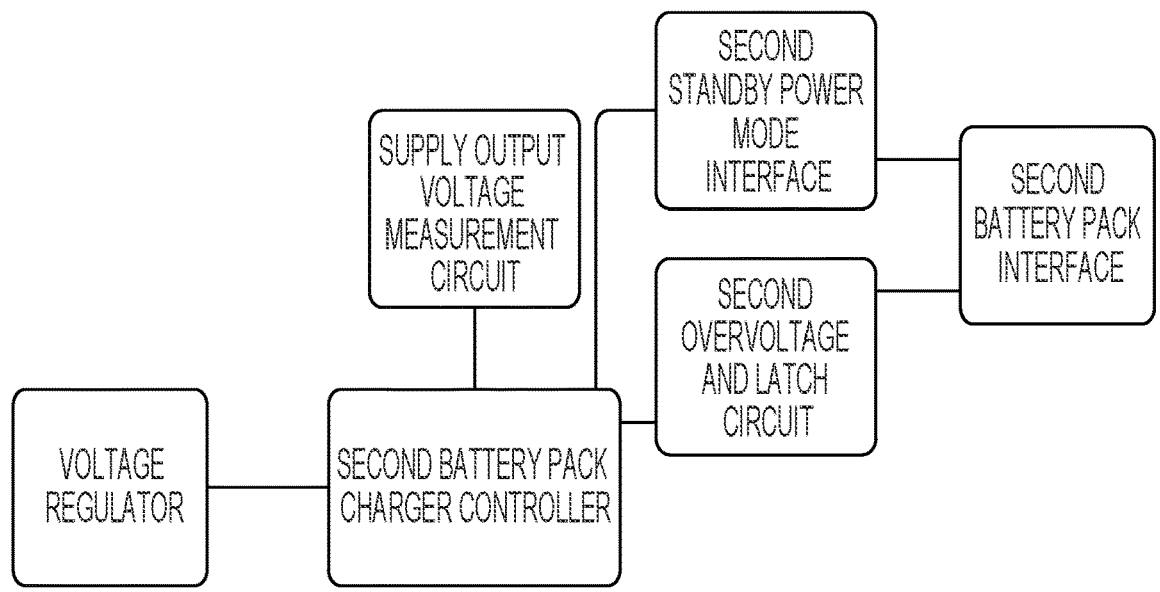
FIG. 26 is a simplified block diagram of a battery pack charging control circuit of the storage module of FIGS. 1 and 8 in accordance with some embodiments.

FIGS. 25 and 26 illustrate battery pack charging control circuits of the storage module 100. FIG. 25 is a block diagram of a first battery pack charging control circuit, for example, a control circuit to charge an 18V battery pack 180. FIG. 26 is a block diagram of a second battery pack charging control circuit, for example, a control circuit to charge a 12V battery pack 180.

Referring to FIG. 25, the first battery pack charging control circuit includes a first battery pack interface that receives a first power tool battery pack 180. A first pack voltage measurement circuit is coupled to the first battery pack interface to measure a pack voltage of the first power tool battery pack 180. A supply output voltage measurement circuit is also provided to measure a voltage of the charging voltage supply, for example, from an active clamp flyback converter. A first overvoltage and latch circuit is provided to latch the output when an overvoltage condition is detected. A first standby power mode interface is also included in the first battery pack charging control circuit to provide standby power. The first pack voltage measurement circuit, the supply output voltage measurement circuit, the first overvoltage and latch circuit, and the first standby power mode interface are controlled by a first battery pack charger controller. A voltage regulator provides operating power to the first battery pack charger controller and other components of the first battery pack charging control circuit.

Referring to FIG. 26, the second battery pack charging control circuit includes a second battery pack interface that receives a second power tool battery pack 180. A supply output voltage measurement circuit is also provided to measure a voltage of the charging voltage supply, for example, from an active clamp flyback converter. A second overvoltage and latch circuit is provided to latch the output when an overvoltage condition is detected. A second standby power mode interface is also included in the second battery pack charging control circuit to provide standby power. The supply output voltage measurement circuit, the second overvoltage and latch circuit, and the second standby power mode interface are controlled by a second battery pack charger controller. A voltage regulator provides operating power to the second battery pack charger controller and other components of the second battery pack charging control circuit.

What is claimed is:

1. A charger for power tool battery packs comprising:
a battery pack interface configured to receive a power tool battery pack;
an AC power input for receiving input AC power;
a converter for converting AC power at the AC power input to high-voltage DC output; and
a DC-DC converter connected between the converter and the battery pack interface, the DC-DC converter including an active clamp flyback topology and configured to convert the high-voltage DC output to a charging DC power provided to the battery pack interface,
wherein the DC-DC converter further includes:
an active clamp flyback converter receiving the high-voltage DC output;
an active clamp flyback controller configured to control the active clamp flyback converter to convert the high-voltage DC output to a corresponding voltage;
a charge FET electrically connected between the AC flyback converter and the battery pack interface; and
a charge FET control circuit configured to enable and disable the charge FET to charge the power tool battery pack using the corresponding voltage.

2. The charger of claim 1, further comprising:
an electro-magnetic interference filter provided between the AC power input and the battery pack interface.

3. The charger of claim 1, wherein the converter includes an active power factor correction (PFC) converter.

4. The charger of claim 1, wherein the high-voltage DC output is about 400 Volts.

5. The charger of claim 1, further comprising a DC bus receiving the high-voltage DC output.

6. The charger of claim 5, further comprising:
a housekeeping power supply; and
a universal serial bus (USB) charging power supply, wherein the DC bus routes the high-voltage DC output to the housekeeping power supply, the USB charging power supply, and the DC-DC converter.

7. The charger of claim 6, wherein the housekeeping power supply includes a quasi-resonant (QR) flyback converter for converting the high-voltage DC output to a voltage level for use by the charger.

8. The charger of claim 1, wherein the active clamp flyback topology includes an active clamp circuit having a clamp FET and a clamp capacitor connected in series, wherein the active clamp circuit is connected in parallel with the primary side of a two winding inductor of the DC-DC converter.

9. A charger for power tool battery packs comprising:
a battery pack interface configured to receive a power tool battery pack;
an AC power input for receiving input AC power;
a converter for converting AC power at the AC power input to high-voltage DC output;
a DC-DC converter connected between the converter and the battery pack interface, the DC-DC converter including an active clamp flyback topology and configured to convert the high-voltage DC output to a charging DC power provided to the battery pack interface;
a DC bus receiving the high-voltage DC output;
a housekeeping power supply;
a universal serial bus (USB) charging power supply, wherein the DC bus routes the high-voltage DC output to the housekeeping power supply, the USB charging power supply, and the DC-DC converter; and
one or more USB ports connected to the USB charging power supply,
wherein the USB charging power supply includes a quasi-resonant (QR) flyback converter for converting the high-voltage DC output to a voltage level for powering the one or more USB ports.

10. The charger of claim 9, further comprising:
a housing;
a storage compartment in the housing; and
a charger compartment in the housing, the charger compartment including the battery pack interface.

11. A charger for power tool battery packs comprising:
a housing;
a charging circuit in the housing for charging one or more power tool battery packs;
a battery pack interface configured to receive a power tool battery pack;
a power cord receiving an alternating current (AC) input;
an active power factor correction (PFC) converter receiving AC power from the power cord and configured to convert the AC power to a high-voltage DC output; and
a DC-DC converter electrically connected between the active PFC converter and the battery pack interface, the DC-DC converter including an active clamp flyback topology,
wherein the DC-DC converter includes:
an active clamp flyback converter receiving the high-voltage DC output;
an active clamp flyback controller configured to control the active clamp flyback converter to convert the high-voltage DC output to a corresponding voltage;
a charge FET electrically connected between the active clamp flyback converter and the battery pack interface; and
a charge FET control circuit configured to enable and disable the charge FET to charge the power tool battery pack using the corresponding voltage.

12. The charger of claim 11, further comprising:
a DC bus receiving the high-voltage DC output;
a housekeeping power supply, wherein the housekeeping power supply includes a quasi-resonant (QR) flyback converter for converting the high-voltage DC output to a voltage level for use by the charger; and
a universal serial bus (USB) charging power supply,
wherein the DC bus routes the high-voltage DC output to the housekeeping power supply, the USB charging power supply, and the DC-DC converter.

13. The charger of claim 11, wherein the active clamp flyback topology includes an active clamp circuit having a clamp FET and a clamp capacitor connected in series, wherein the active clamp circuit is connected in parallel with the primary side of a two winding inductor of the DC-DC converter.

14. A charger for power tool battery packs comprising:
a housing;
a charging circuit in the housing for charging one or more power tool battery packs;
a battery pack interface configured to receive a power tool battery pack;
a power cord receiving an alternating current (AC) input;
an active power factor correction (PFC) converter receiving AC power from the power cord and configured to convert the AC power to a high-voltage DC output;
a DC-DC converter electrically connected between the active PFC converter and the battery pack interface, the DC-DC converter including an active clamp flyback topology;
a DC bus receiving the high-voltage DC output;
a housekeeping power supply, wherein the housekeeping power supply includes a quasi-resonant (QR) flyback converter for converting the high-voltage DC output to a voltage level for use by the charger;
a universal serial bus (USB) charging power supply, wherein the DC bus routes the high-voltage DC output to the housekeeping power supply, the USB charging power supply, and the DC-DC converter; and
one or more USB ports connected to the USB charging power supply,
wherein the USB charging power supply includes a quasi-resonant (QR) flyback converter converting the high-voltage DC output to a voltage level for powering the one or more USB ports.

15. A charger for power tool battery packs comprising:
a housing;
a charging circuit in the housing for charging power tool battery packs;
a battery pack interface configured to receive a power tool battery pack;
a power cord receiving an alternating current (AC) input;
an active power factor correction (PFC) converter receiving AC power from the power cord and configured to convert the AC power to a high-voltage DC output;
a DC bus receiving the high-voltage DC output;
a housekeeping power supply;
a universal serial bus (USB) charging power supply; and
a DC-DC converter connected between the DC bus and the battery pack interface, the DC-DC converter including an active clamp flyback topology, wherein the DC bus routes the high-voltage DC output to the housekeeping power supply, the USB charging power supply, and the DC-DC converter;
wherein the DC-DC converter includes:
an active clamp flyback converter receiving the high-voltage DC output;
an active clamp flyback controller configured to control the active clamp flyback converter to convert the high-voltage DC output to a corresponding voltage;
a charge FET electrically connected between the active clamp flyback converter and the battery pack interface; and
a charge FET control circuit configured to enable and disable the charge FET to charge the power tool battery pack using the corresponding voltage, wherein the housekeeping power supply includes a quasi-resonant (QR) flyback converter for converting the high-voltage DC output to a voltage level for use by the charger.

16. The charger of claim 15, further comprising:
one or more USB ports connected to the USB charging power supply, wherein the USB charging power supply includes a quasi-resonant (QR) flyback converter for converting the high-voltage DC output to a voltage level for powering the one or more USB ports.

17. The charger of claim 15, wherein the active clamp flyback topology includes an active clamp circuit having a clamp FET and a clamp capacitor connected in series, wherein the active clamp circuit is connected in parallel with the primary side of a two winding inductor of the DC-DC converter.

\* \* \* \* \*